US009377601B2

(12) United States Patent
Kusaka

(10) Patent No.: US 9,377,601 B2
(45) Date of Patent: Jun. 28, 2016

(54) FOCUS DETECTION DEVICE AND IMAGE-CAPTURING APPARATUS

(71) Applicant: NIKON CORPORATION, Tokyo (JP)

(72) Inventor: Yosuke Kusaka, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 14/422,609

(22) PCT Filed: Aug. 21, 2013

(86) PCT No.: PCT/JP2013/072282
§ 371 (c)(1),
(2) Date: Feb. 19, 2015

(87) PCT Pub. No.: WO2014/030668
PCT Pub. Date: Feb. 27, 2014

(65) Prior Publication Data
US 2015/0234148 A1 Aug. 20, 2015

(30) Foreign Application Priority Data
Aug. 21, 2012 (JP) .................................. 2012-182497

(51) Int. Cl.
G02B 7/34 (2006.01)
H04N 5/232 (2006.01)
(Continued)

(52) U.S. Cl.
CPC ........ G02B 7/34 (2013.01); G03B 13/36 (2013.01); H04N 5/23212 (2013.01); H04N 9/045 (2013.01)

(58) Field of Classification Search
CPC ...... G02B 7/34; G03B 13/36; H04N 5/23212; H04N 9/045
See application file for complete search history.

(56) References Cited

U.S. PATENT DOCUMENTS 6,819,360 B1    11/2004  Ide et al.
2001/0036361 A1 11/2001  Suda
(Continued)

FOREIGN PATENT DOCUMENTS

JP    2000-292686 A    10/2000
JP    2007-011314 A    1/2007
(Continued)

OTHER PUBLICATIONS

Nov. 12, 2013 International Search Report issued in International Patent Application No. PCT/JP2013/072282.
(Continued)

Primary Examiner — Twyler Haskins
Assistant Examiner — Padma Haliyur
(74) Attorney, Agent, or Firm — Oliff PLC

(57) ABSTRACT

A focus detection device includes: a plurality of first pixels having first color filters, via which a pair of first signals, to be used for split-pupil phase detection, are output; a plurality of second pixels having second color filters, via which a pair of second signals, to be used for the split-pupil phase detection, are output; a phase difference detection unit that detects a phase difference manifested by the first signals or a phase difference manifested by the second signals; and a defocus amount calculation unit that calculates a defocus amount by using a first conversion coefficient corresponding to the first color when the phase difference detection unit has detected the phase difference manifested by the first signals and by using a second conversion coefficient corresponding to the second color when the phase difference detection unit has detected the phase difference manifested by the second signals.

16 Claims, 22 Drawing Sheets

(51) Int. Cl.
*H04N 9/04* (2006.01)
*G03B 13/36* (2006.01)

(56) References Cited

U.S. PATENT DOCUMENTS

| | | | |
|---|---|---|---|
| 2008/0107355 A1* | 5/2008 | Onuki | H04N 5/2254 382/284 |
| 2008/0240701 A1* | 10/2008 | Kusaka | G02B 7/36 396/104 |
| 2008/0277566 A1 | 11/2008 | Utagawa | |
| 2011/0013061 A1* | 1/2011 | Hoda | G02B 7/34 348/294 |
| 2011/0025904 A1 | 2/2011 | Onuki et al. | |
| 2011/0085785 A1* | 4/2011 | Ishii | G03B 13/00 396/104 |
| 2011/0199506 A1 | 8/2011 | Takamiya | |
| 2011/0205423 A1 | 8/2011 | Tsukada | |
| 2012/0026372 A1* | 2/2012 | Noguchi | G02B 7/282 348/302 |

FOREIGN PATENT DOCUMENTS

| | | |
|---|---|---|
| JP | 2009-141390 A | 6/2009 |
| JP | 2009-244854 A | 10/2009 |
| JP | 2010-140013 A | 6/2010 |

OTHER PUBLICATIONS

Mar. 10, 2016 Search Report issued in European Application No. 13830500.8.

\* cited by examiner (a)

|   |   |   |   |   |   |   |   |   |   |   |   |   |   |   |
|---|---|---|---|---|---|---|---|---|---|---|---|---|---|---|
| R | G | R | G | R | G | R | G | R | G | R | G | R | G | R | G |
| G | B | G | B | G | B | G | B | G | B | G | B | G | B | G | B |
| R | G | R | G | R | G | R | G | R | G | R | G | R | G | R | G |
| G | B | G | B | G | B | G | B | G | B | G | B | G | B | G | B |
| R | G | R | G | R | G | R | G | R | G | R | G | R | G | R | G |
| G | B | G | B | G | B | G | B | G | B | G | B | G | B | G | B | — L3
| R | G | R | G | R | G | R | G | R | G | R | G | R | G | R | G | — L4
| G | G | G | G | G | G | G | G | G | G | G | G | G | G | G | G | — L1
| R | R | R | R | R | R | R | R | R | R | R | R | R | R | R | R | — L2
| G | B | G | B | G | B | G | B | G | B | G | B | G | B | G | B | — L5
| R | G | R | G | R | G | R | G | R | G | R | G | R | G | R | G |
| G | B | G | B | G | B | G | B | G | B | G | B | G | B | G | B |
| R | G | R | G | R | G | R | G | R | G | R | G | R | G | R | G |
| G | B | G | B | G | B | G | B | G | B | G | B | G | B | G | B |
| R | G | R | G | R | G | R | G | R | G | R | G | R | G | R | G |
| G | B | G | B | G | B | G | B | G | B | G | B | G | B | G | B |

# FOCUS DETECTION DEVICE AND IMAGE-CAPTURING APPARATUS

TECHNICAL FIELD

The present invention relates to a focus detection device and an image-capturing apparatus that includes the focus detection device.

BACKGROUND ART

Focus detection pixels, each including a micro-lens and a pair of photoelectric conversion units disposed to the rear of the micro-lens, are arrayed on a predetermined focal plane of a photographic lens. Via this array, a pair of image signals corresponding to a pair of images formed with a pair of focus detection light fluxes passing through an optical system are generated. The focusing condition (a defocus amount indicating the extent of defocus) for the photographic lens is determined by detecting an image shift amount (phase difference), i.e., the extent of image shift manifested by the pair of image signals. A focus detection device engaged in such an operation is known in the related art as a focus detection device adopting the split-pupil phase detection method.

Color filters in a plurality of different colors may be disposed at the focus detection pixels. In such a case, focus detection is executed in correspondence to each of the plurality of colors by detecting the image shift amount for each pair of image signals output from focus detection pixels having same-color filters (see PTL 1).

CITATION LIST

Patent Literature

PTL 1: Japanese Laid Open Patent Publication No. 2000-292686

SUMMARY OF INVENTION

Technical Problem

There is an issue that needs to be addressed in this type of focus detection device, in that the plurality of defocus amounts, each calculated through focus detection executed in correspondence to a specific color, do not always match, i.e., the focus detection results corresponding to one color may be different from the focus detection results obtained for another color.

Solution to Problem

According to the 1st aspect of the present invention, a focus detection device comprises: a plurality of first pixels having first color filters corresponding to a first color disposed thereat, via which a pair of first signals, to be used for split-pupil phase detection, are output; a plurality of second pixels having second color filters corresponding to a second color disposed thereat, via which a pair of second signals, to be used for the split-pupil phase detection, are output; a phase difference detection unit that detects a phase difference manifested by the first signals or a phase difference manifested by the second signals; and a defocus amount calculation unit that calculates a defocus amount by using a first conversion coefficient corresponding to the first color when the phase difference detection unit has detected the phase difference manifested by the first signals and by using a second conversion coefficient corresponding to the second color when the phase difference detection unit has detected the phase difference manifested by the second signals.

According to the 2nd aspect of the present invention, in the focus detection device according to the 1st aspect, it is preferred that the first color is a color among red color, green color and blue color; the second color is either of remaining two colors among the red color, the green color and the blue color; the first conversion coefficient and the second conversion coefficient are each a conversion coefficient among a conversion coefficient corresponding to the red color, a conversion coefficient corresponding to the green color and a conversion coefficient corresponding to the blue color; and the conversion coefficient corresponding to the red color is greater than the conversion coefficient corresponding to the green color, and the conversion coefficient corresponding to the green color is greater than the conversion coefficient corresponding to the blue color.

According to the 3rd aspect of the present invention, in the focus detection device according to the 1st aspect or the 2nd aspect, it is preferred that the focus detection device further comprises: a selection unit that selects a pair of signals, which are either the first signals or the second signals, that satisfy a predetermined condition. The phase difference detection unit detects the phase difference manifested by one pair of signals satisfying the predetermined condition, having been selected by the selection unit.

According to the 4th aspect of the present invention, in the focus detection device according to the 3rd aspect, it is preferred that the focus detection device further comprises: a contrast calculation unit that calculates a plurality of contrast values each indicating contrast in the first signals or the second signals. The pair of signals that satisfy the predetermined condition are either the first signals or the second signals that correspond to a contrast value, among the plurality of contrast values, taking a greatest value.

According to the 5th aspect of the present invention, in the focus detection device according to the 3rd aspect, it is preferred that the focus detection device further comprises: a light source color detection sensor that estimates a light source color. The pair of signals that satisfy the predetermined condition are either the first signals or the second signals that correspond to the light source color estimated by the light source color detection sensor.

According to the 6th aspect of the present invention, in the focus detection device according to the 3rd aspect, it is preferred that the focus detection device further comprises: a plurality of image-capturing pixels disposed around the plurality of first pixels and the plurality of second pixels, which include a plurality of first image-capturing pixels having the first color filters disposed thereat and a plurality of second image-capturing pixels having the second color filters disposed thereat. When outputs of a plurality of imaging signals provided from the plurality of first image-capturing pixels, among outputs of a plurality of imaging signals provided from the plurality of image-capturing pixels, are greatest, the pair of signals that satisfy the predetermined condition are the first signals.

According to the 7th aspect of the present invention, in the focus detection device according to the 3rd aspect, it is preferred that the focus detection device further comprises: a read unit that reads out a specific color from an optical system at which an optical system color filter corresponding to the specific color is mounted. The pair of signals that satisfy the predetermined condition are either the first signals or the second signals that correspond to the specific color.

According to the 8th aspect of the present invention, in the focus detection device according to any one of the 1st through 7th aspects, it is preferred that: the plurality of first pixels and the plurality of second pixels each include a micro-lens and a pair of photoelectric conversion units; and the pair of photoelectric conversion units are projected via the micro-lens onto an exit pupil of an optical system.

According to the 9th aspect of the present invention, in the focus detection device according to any one of 1st through 8th aspects, it is preferred that the focus detection device further comprises: an offset quantity setting unit that sets a first offset quantity corresponding to the first color and a second offset quantity corresponding to the second color. When the phase difference detection unit has detected the phase difference manifested by the first signals, the defocus amount calculation unit calculates the defocus amount by adding the first offset quantity to a product of the first conversion coefficient multiplied by the phase difference, and when the phase difference detection unit has detected the phase difference manifested by the second signals, the defocus amount calculation unit calculates the defocus amount by adding the second offset quantity to a product of the second conversion coefficient multiplied by the phase difference.

According to the 10th aspect of the present invention, in the focus detection device according to any one of 1st through 9th aspects, it is preferred that the focus detection device further comprises: a plurality of third pixels having third color filters corresponding to a third color disposed thereat, which output a pair of third signals to be used for split-pupil phase detection. The phase difference detection unit detects a phase difference among the phase difference manifested by the first signals, the phase difference manifested by the second signals and a phase difference manifested by the third signals; when the phase difference detection unit has detected the phase difference manifested by the first signals, the defocus amount calculation unit calculates the defocus amount by multiplying the first conversion coefficient by the phase difference, when the phase difference detection unit has detected the phase difference manifested by the second signals, the defocus amount calculation unit calculates the defocus amount by multiplying the second conversion coefficient by the phase difference, and when the phase difference detection unit has detected the phase difference manifested by the third signals, the defocus amount calculation unit calculates the defocus amount by multiplying a third conversion coefficient corresponding to the third color by the phase difference; the first color, the second color and the third color are each a color among the red color, the green color and the blue color; and the first conversion coefficient, the second conversion coefficient and the third conversion coefficient are each a conversion coefficient among a conversion coefficient corresponding to the red color, a conversion coefficient corresponding to the green color and a conversion coefficient corresponding to the blue color.

According to the 11th aspect of the present invention, in the focus detection device according to the 10th aspect, it is preferred that the first color filters, the second color filters and the third color filters are disposed based upon a Bayer array arrangement rule.

According to the 12th aspect of the present invention, in the focus detection device according to any one of 1st through 11th aspects, it is preferred that a focus detection pixel row that includes the plurality of first pixels and the plurality of second pixels disposed thereat and a focus detection pixel row that includes the plurality of second pixels and the plurality of third pixels disposed thereat are set adjacent to each other.

According to the 13th aspect of the present invention, in the focus detection device according to any one of 1st through 11th aspects, it is preferred that the focus detection device further comprises: a selecting unit that selects a focus detection position that is either a first focus detection position in correspondence to which a plurality of first focus detection pixel rows are disposed or a second focus detection position in correspondence to which a plurality of second focus detection pixel rows are disposed. Once the selecting unit selects the first focus detection position as the focus detection position, the phase difference detection unit detects the phase difference based upon the first signals and the second signals respectively output from the plurality of first pixels and the plurality of second pixels forming the plurality of first focus detection pixel rows.

According to the 14th aspect of the present invention, in the focus detection device according to any one of 1st through 13th aspects, it is preferred that the phase difference detection unit detects a first phase difference manifested by the first signals and a second phase difference manifested by the second signals; and the defocus amount calculation unit calculates the defocus amount based upon a value obtained by multiplying the first conversion coefficient by the first phase difference and a value obtained by multiplying the second conversion coefficient by the second phase difference.

According to the 15th aspect of the present invention, an image-capturing apparatus comprises: a focus detection device according to any one of claims 1 through 14; a drive unit that drives an optical system to a focus match position based upon the defocus amount calculated by the defocus amount calculation unit; and an acquisition unit that obtains image data based upon outputs from a plurality of focus detection pixels, each of which provides a pair of signals used for the split-pupil phase detection, and outputs from a plurality of image-capturing pixels, each of which provides an imaging signal.

Advantageous Effects of Invention

The focus detection device according to the present invention is capable of executing highly accurate focus detection that is unaffected by the differences among the colors of light.

BRIEF DESCRIPTION OF DRAWINGS

FIG. 18 indicates the arrangement pattern with which color filters are disposed at image-capturing pixels and focus detection pixels.

DESCRIPTION OF EMBODIMENTS

Figure 1:
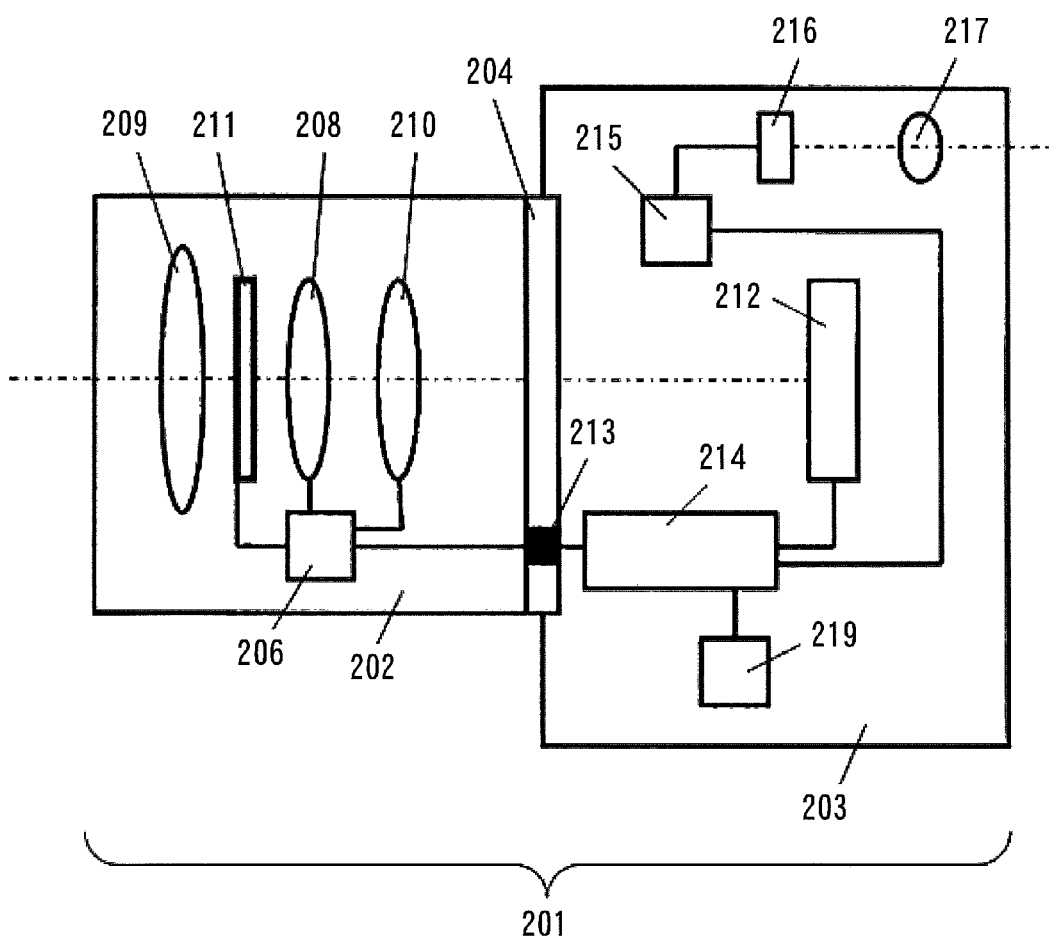
FIG. 1 shows the structure of a digital still camera in a lateral sectional view.

FIG. 1 is a lateral sectional view illustrating the structure of a digital still camera 201 used in conjunction with interchangeable lenses, representing an example of an image-capturing apparatus equipped with the focus detection device achieved in an embodiment of the present invention. The digital still camera 201 includes an interchangeable lens 202 and a camera body 203. The interchangeable lens 202 among various interchangeable lenses is mounted at the camera body 203 via a mount unit 204.

The interchangeable lens 202 includes a lens 209, a zooming lens 208, a focusing lens 210, an aperture 211 and a lens drive control device 206. The lens drive control device 206 is constituted with a microcomputer, a memory, a drive control circuit and the like (none shown). The lens drive control device 206 executes drive control for focus adjustment of the focusing lens 210 and for opening diameter adjustment of the aperture 211 and detects the states of the zooming lens 208, the focusing lens 210 and the aperture 211. In addition, the lens drive control device 206 engages in communication with a body drive control device 214 to be detailed later to transmit lens information to the body drive control device 214 and receive camera information from the body drive control device 214. The aperture 211 forms an opening, the diameter of which can be adjusted, centered on the optical axis for purposes of light amount adjustment and adjustment of the extent of blurring.

An image sensor 212, the body drive control device 214, a liquid crystal display element drive circuit 215, a liquid crystal display element 216, an eyepiece lens 217, a memory card 219 and the like are disposed at the camera body 203. A plurality of image-capturing pixels are two-dimensionally arrayed at the image sensor 212 and a plurality of focus detection pixels are also built into the image sensor over each of areas corresponding to focus detection positions. The image sensor 212 will be described in detail later.

The body drive control device 214 includes a microcomputer, a memory, a drive control circuit and the like. The body drive control device 214, is engaged in repeated execution of drive control for the image sensor 212, read of image signals and focus detection signals, calculation of focus detection and focus adjustment for the interchangeable lens 202 based upon the focus detection signals, and also processes and records the image signals, controls camera operations and the like. The body drive control device 214 also engages in communication with the lens drive control device 206 via an electrical contact point 213 to receive the lens information and transmit the camera information (indicating a defocus amount, an aperture number and the like).

The liquid crystal display element 216 functions as an electronic viewfinder (EVF). A live view image, brought up on display at the liquid crystal display element 216 by the liquid crystal display element drive circuit 215 based upon image signals provided via the image sensor 212, can be observed by the photographer via the eyepiece lens 217. The memory card 219 is an image storage medium in which image data generated based upon image signals obtained by the image sensor 212 capturing an image are stored.

A subject image is formed on the light-receiving surface of the image sensor 212 with a light flux having passed through the interchangeable lens 202. The subject image undergoes photoelectric conversion at the image sensor 212 and subsequently, image signals and focus detection signals are transmitted to the body drive control device 214.

The body drive control device 214 calculates the defocus amount indicating the extent of defocus based upon focus detection signals output from focus detection pixels at the image sensor 212 and transmits this defocus amount to the lens drive control device 206. In addition, the body drive control device 214 generates image data by processing the image signals provided from the image sensor 212 and stores the image data thus generated into the memory card 219. It also provides live view image signals from the image sensor 212 to the liquid crystal display element drive circuit 215 so as to bring up a live view image on display at the liquid crystal display element 216. Moreover, the body drive control device 214 provides aperture control information to the lens drive control device 206 to enable control of the opening at the aperture 211.

The lens drive control device 206 updates the lens information in correspondence to the current focusing state, zooming state and aperture setting state, the maximum aperture number and the like. More specifically, the lens drive control device 206 detects the positions of the zooming lens 208 and the focusing lens 210 and the aperture number set for the aperture 211, and calculates correct lens information based upon the lens positions and the aperture number. Alternatively, it may select the lens information corresponding to the lens positions and the aperture number from a lookup table prepared in advance.

In addition, the lens drive control device 206 calculates a lens drive amount indicating the extent to which the lens is to be driven based upon the defocus amount having been received and drives the focusing lens 210 to a focus match position based upon the lens drive amount. The lens drive control device 206 also drives the aperture 211 in correspondence to the aperture number it has received.

Figure 2:
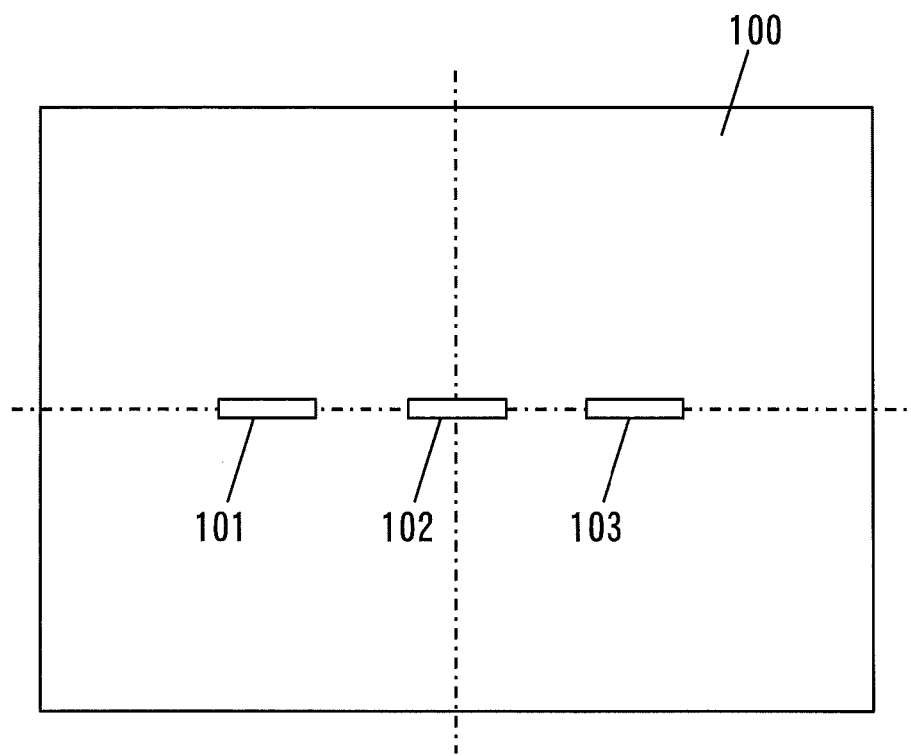
FIG. 2 shows focus detection positions set on the photographic image plane.

The focus detection positions set on the photographic image plane, at one of which an image is sampled on the photographic image plane when focus detection is executed via focus detection pixel rows (a focus detection area, a focus detection position) at the image sensor 212 to be detailed later, are shown in FIG. 2. In the example presented in figure, three focus detection areas 101 through 103 are set at the center, on the left side and on the right side of a rectangular photographic image plane 100. The rectangular focus detection areas 101 through 103 range along the horizontal direction at the photographic image plane. The focus detection areas 101 through 103 each include focus detection pixels disposed linearly along the longer side of the focus detection area.

Figure 3:
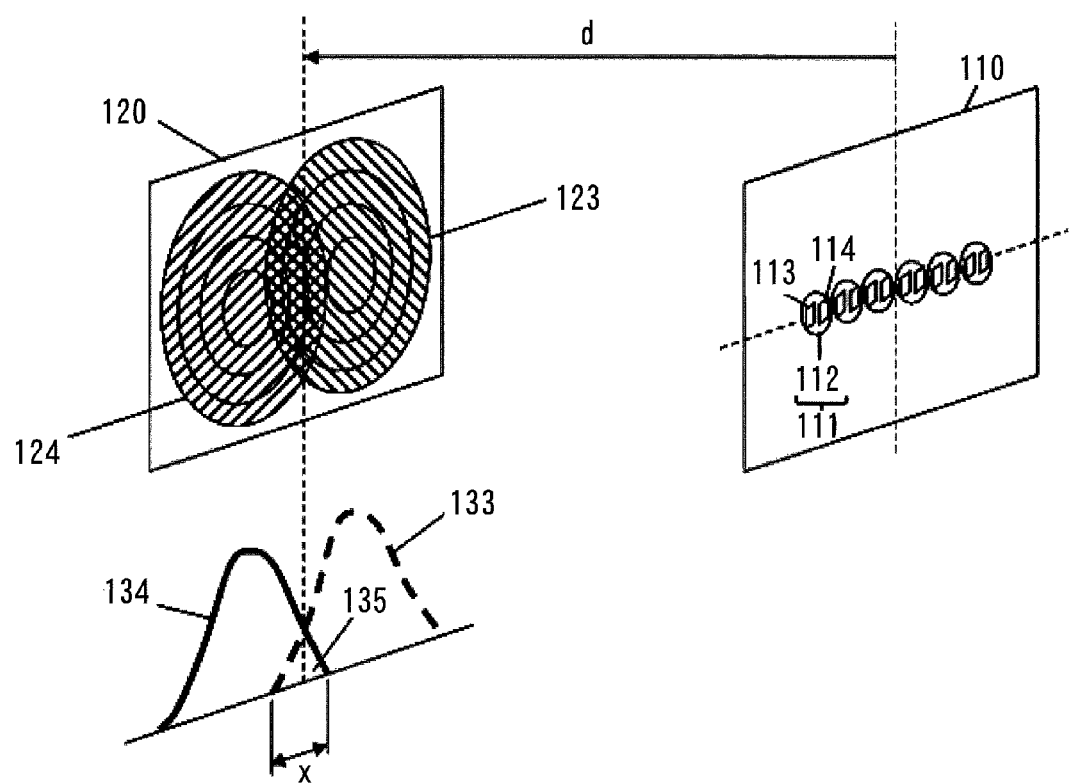
FIG. 3 illustrates the principle of the split-pupil phase detection method adopted in conjunction with focus detection pixels.

Before the structure of the image sensor 212 is described in detail, the principle of the split-pupil phase detection method will be explained in reference to FIG. 3.

On an image-capturing plane 110, a plurality of focus detection pixels 111 are arrayed. The focus detection pixels 11 are each constituted with a micro-lens 112 and a pair of photoelectric conversion units 113 and 114. The pair of photoelectric conversion units 113 and 114 are projected via the micro-lens 112 onto a focus detection pupil plane 120 set to the front of the image-capturing plane 110 over a distance d from the image-capturing plane 110 and thus, a pair of focus detection pupils 123 and 124 are formed. In other words, the light flux forming the focus detection pupil 123, which is part of the light flux passing through the focus detection pupil plane 120 set apart from the image-capturing plane 110 over the distance d along the forward direction, is received at the photoelectric conversion unit 113 of the focus detection pixel 111, whereas the light flux forming the focus detection pupil 124, which is part of the light flux passing through the focus detection pupil plane 120 set apart from the image-capturing plane 110 over the distance d along the forward direction, is received at the photoelectric conversion unit 114 of the focus detection pixel 111. The relative shift amount (a phase difference, an image shift amount) representing the extent of offset manifested by the image signals from the photoelectric conversion units 113 at the focus detection pixels 111 in the array and the image signals from the photoelectric conversion units 114 at the focus detection pixels 111 in the array changes in correspondence to the focusing condition (defocus amount) at an optical system through which an image is formed on the image-capturing plane. Accordingly, the focusing condition (defocus amount) at the optical system can be detected by determining the relative shift amount, representing the extent of relative shift manifested by the image signal string obtained via the photoelectric conversion units 113 and the image signal string obtained via the photoelectric conversion units 114, through arithmetic processing executed on a pair of image signals generated via the focus detection pixels.

It is to be noted that the pair of focus detection pupils 123 and 124 do not assume distributions that would be achieved simply by projecting the pair of photoelectric conversion units 113 and 114, but rather, they assume distributions with shallow verges due to blurring attributable to the diffraction of light that occurs in correspondence to the diameter of the openings at the micro-lenses. The opening diameter of the micro-lenses 111 substantially matches the pixel size. A pair of focus detection pupil distributions 133 and 134 in FIG. 3 are obtained by scanning the pair of focus detection pupils 123 and 124 along the direction in which the focus detection pupils 123 and 124 are set side-by-side with a slit ranging along a direction perpendicular to the direction in which the focus detection pupils 123 and 124 are set side-by-side. Due to the effect of the diffraction mentioned above, the pair of focus detection pupil distributions 133 and 134 overlap each other over an overlapping area 135.

Figure 4:
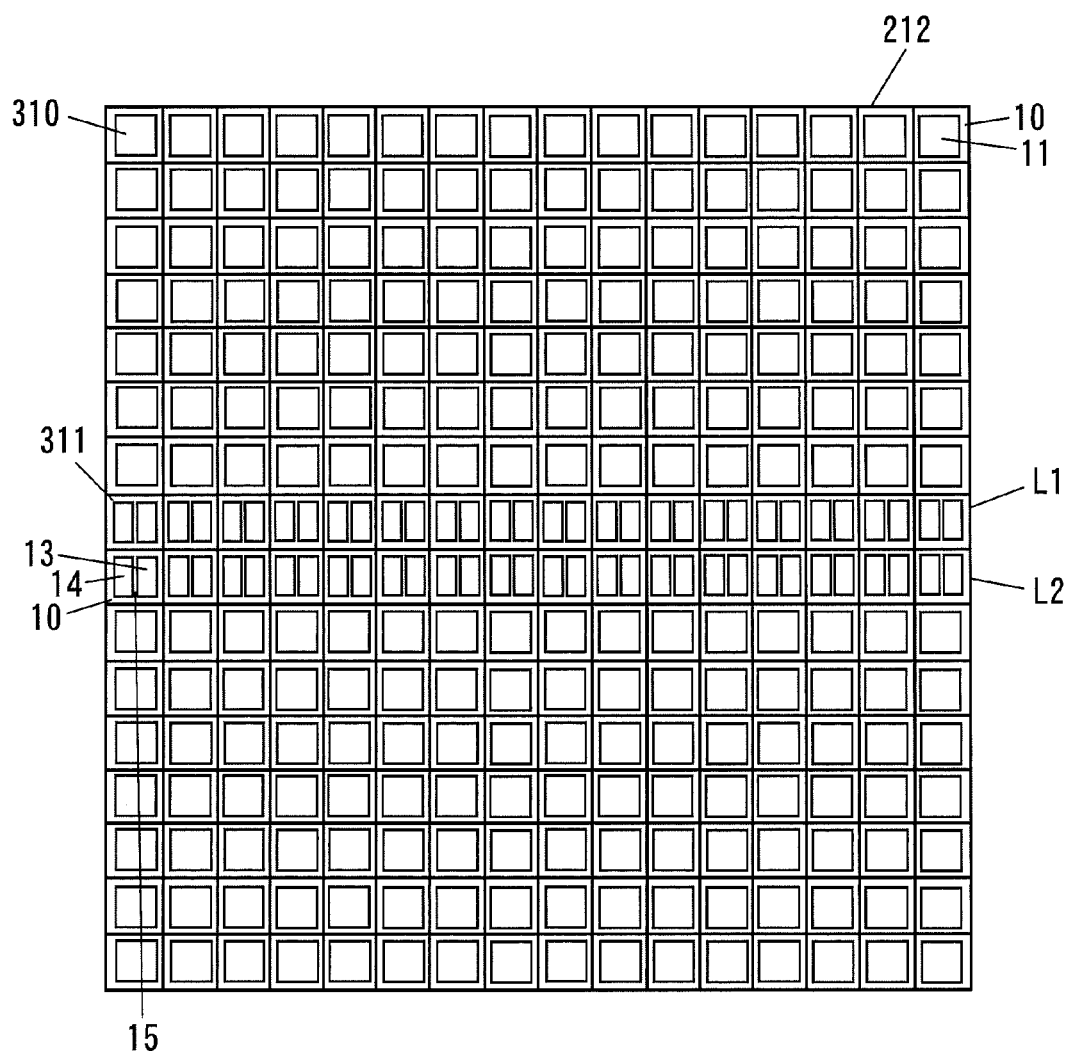
FIG. 4 shows in detail the structure of an image sensor in a front view.
Figure 5:
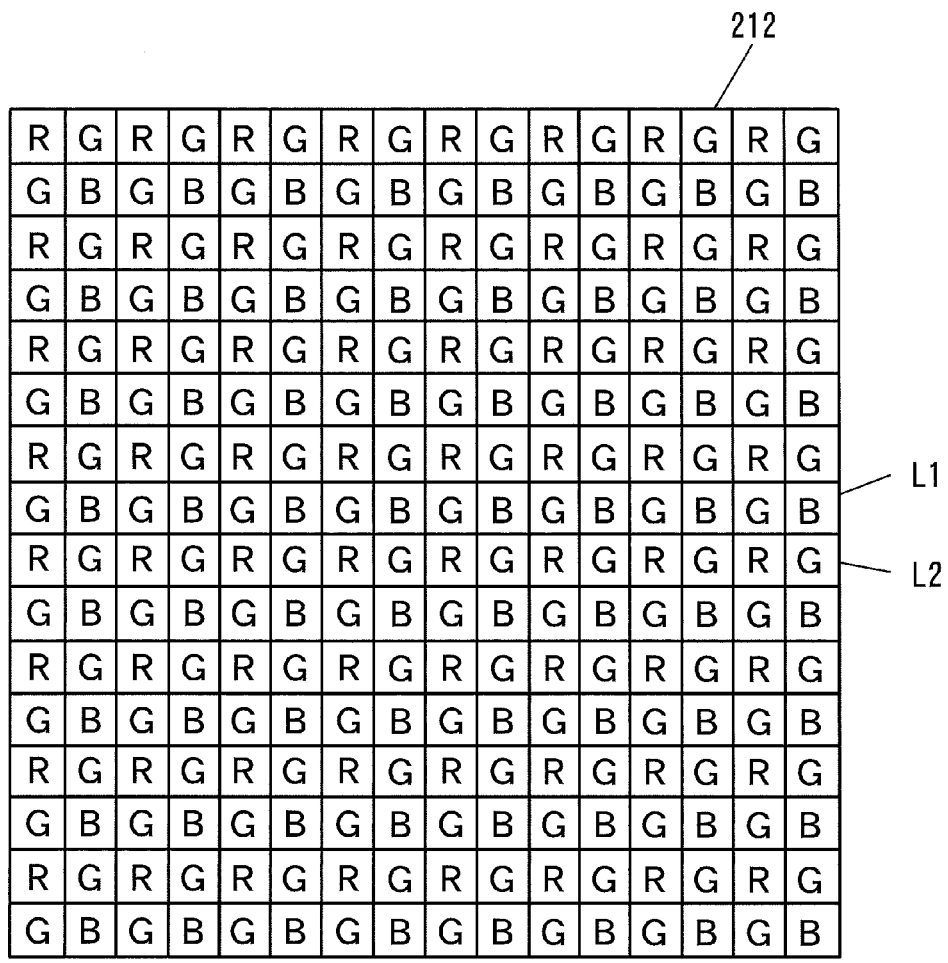
FIG. 5 indicates the arrangement pattern with which color filters are disposed at image-capturing pixels and focus detection pixels.

FIGS. 4 and 5 each show in detail the structure of the image sensor 212 in a front view of an enlargement of an area near the focus detection area 101, 102 or 103 on the image sensor 212. FIG. 4 shows the layout of image-capturing pixels 310 and focus detection pixels 311. As FIG. 4 indicates, the image-capturing pixels 310 and the focus detection pixels 311 are arrayed in a dense two-dimensional square grid pattern.

Figure 6:
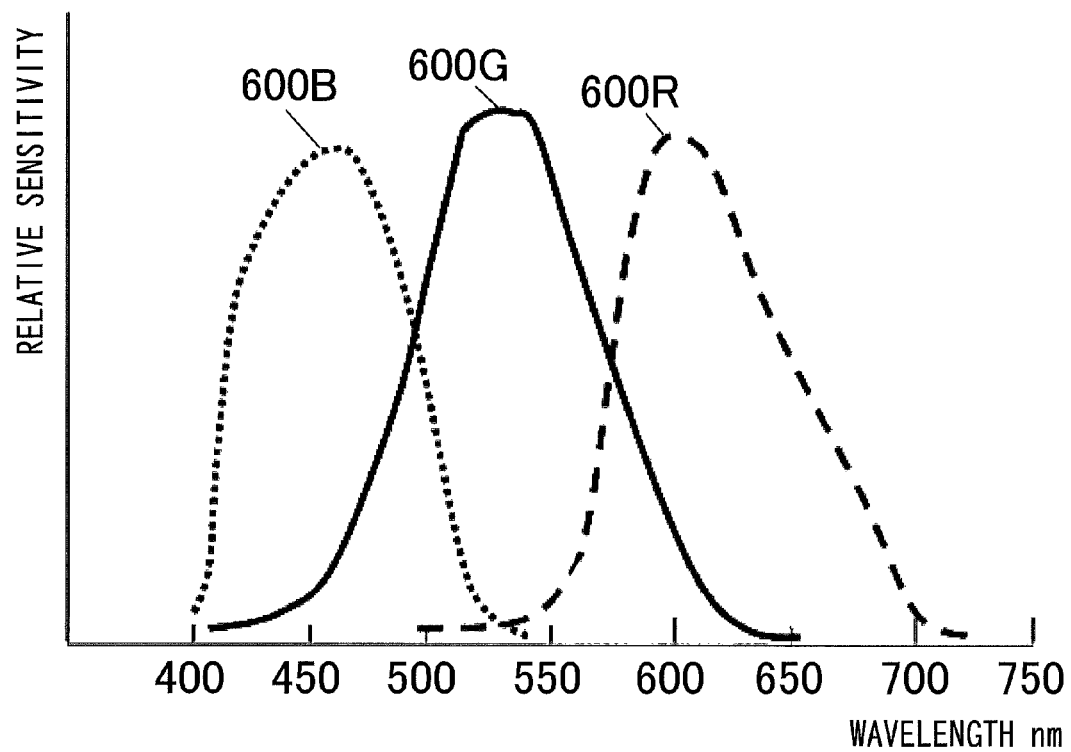
FIG. 6 indicates the spectral sensitivity characteristics of the red color filters, the green color filters and the blue color filters.

The focus detection pixels 311 are disposed along two consecutive pixel lines extending along the horizontal direction, thus forming two focus detection pixel rows L1 and L2 adjacent to each other. FIG. 5 indicates the arrangement with which color filters are disposed at the image-capturing pixels 310 and the focus detection pixels 311 in FIG. 4. Color filters, i.e., red color filters R, green color filters G and blue color filters B, are disposed at the image-capturing pixels 310 and the focus detection pixels 311 in conformance to the Bayer array rule. Spectral sensitivity characteristics 600R, 600G and 600B of the individual color filters, i.e., the red color filters R, the green color filters G and the blue color filters B, achieve high levels of spectral sensitivity at different wavelengths, as indicated in FIG. 6. Accordingly, one of the two focus detection pixel rows L1 and L2, formed adjacent to each other along two pixel lines on the image sensor 212, i.e., the focus detection pixel row L1, is made up with a plurality of focus detection pixels each having a green color filter G formed thereat and a plurality of focus detection pixels each having a blue color filter B disposed thereat, set at alternate positions, whereas the other focus detection pixel row L2 is made up with a plurality of focus detection pixels each having a red color filter R disposed thereat and a plurality of focus detection pixels each having a green color filter G formed thereat, set at alternate positions.

As FIG. 4 shows, the image-capturing pixels 310 each include a rectangular micro-lens 10 and a photoelectric conversion unit 11 with a light receiving area thereof restricted by a light-shielding mask, as will be described later. As FIG. 4 shows, the focus detection pixels 311 each include a rectangular micro-lens 10 and a pair of photoelectric conversion units 13 and 14 formed by splitting the photoelectric conversion unit 11 of an image-capturing pixel 310 into two parts via an element separation area 15 ranging along the vertical direction. It is to be noted that in order to simplify the illustration, FIG. 4 does not show any color filters. In addition, it is desirable to form the pair of photoelectric conversion units 13 and 14 as close as possible to each other by minimizing the width of the element separation area 15 so as to ensure that the sum of the outputs from the pair of photoelectric conversion units 13 and 14 at a focus detection pixel 311 is equivalent to the output of the photoelectric conversion unit 11 in an image-capturing pixel 310.

Figure 7:
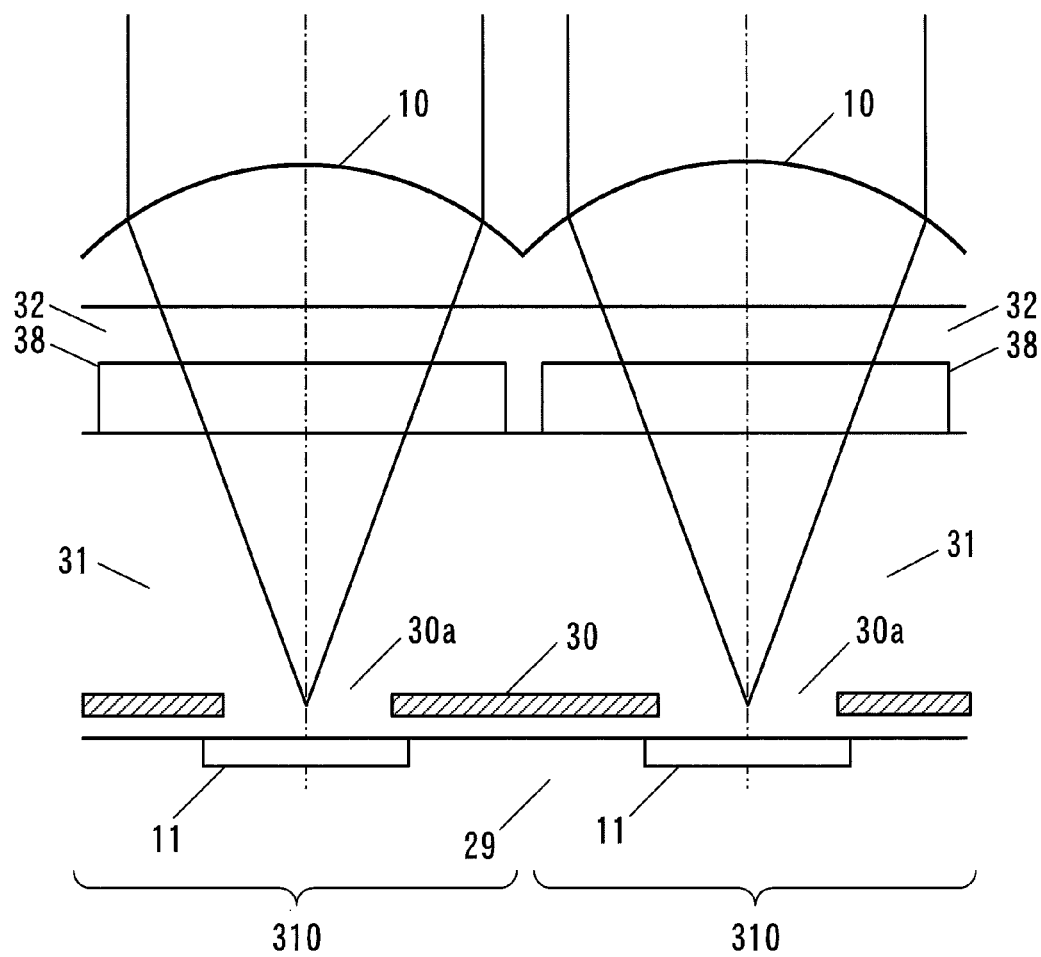
FIG. 7 shows image-capturing pixels in a sectional view.

FIG. 7 shows image-capturing pixels 310 in FIG. 4 in a sectional view. A light-shielding mask 30 is formed above and in close proximity to the photoelectric conversion units 11 used for image-capturing operation at the image-capturing pixels 310. The photoelectric conversion units 11 each receive light having passed through an opening 30a in the light-shielding mask 30. Above the light-shielding mask 30, a leveling layer 31 is formed and color filters 38 are formed above the leveling layer 31. Above the color filters 38, a leveling layer 32 is formed and micro-lenses 10 are formed above the leveling layer 32. The shape of each opening 30a is projected forward via the corresponding micro-lens 10 onto an exit pupil, as will be explained later. The photoelectric conversion units 11 are formed on a semiconductor circuit substrate 29.

Figure 8:
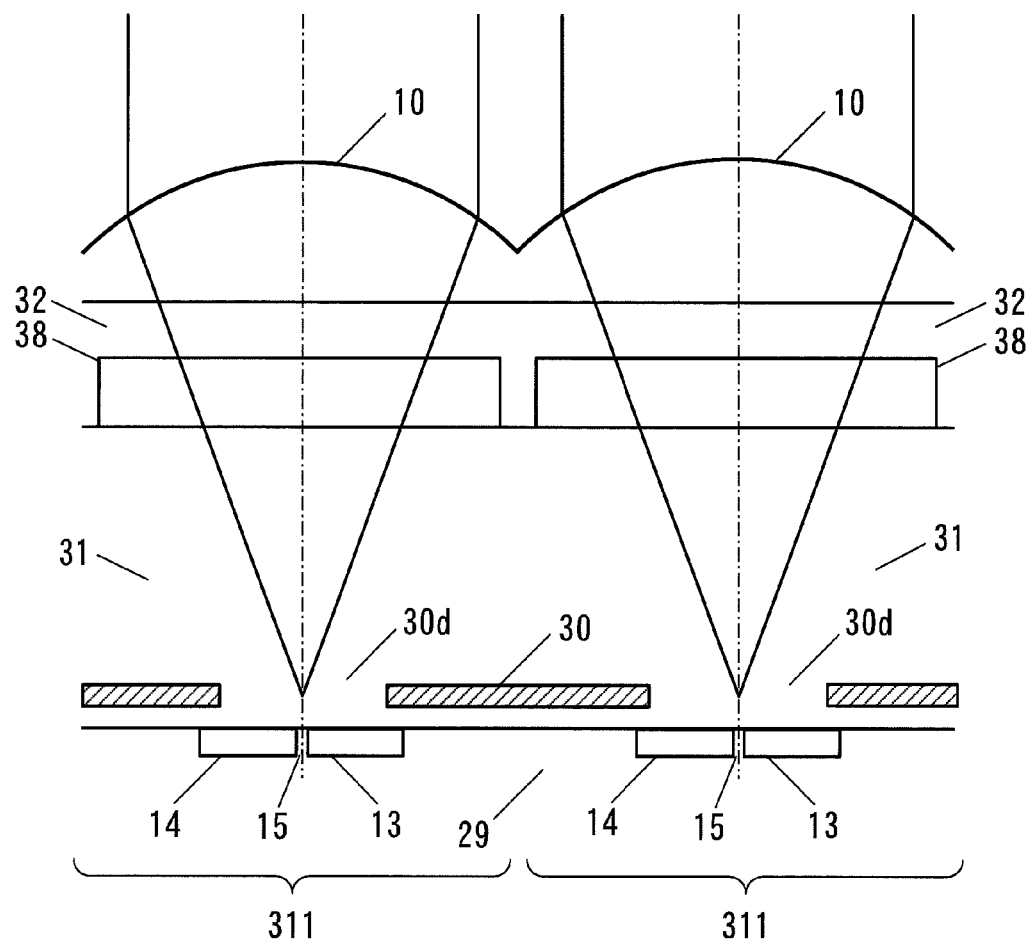
FIG. 8 shows focus detection pixels in a sectional view.

FIG. 8 shows focus detection pixels 311 in FIG. 4 in a sectional view. The light-shielding mask 30 is formed above and in close proximity to the photoelectric conversion units 13 and 14, and each pair of photoelectric conversion units 13 and 14 receive light having passed through an opening 30d in the light-shielding mask 30. The leveling layer 31 is formed above the light-shielding mask 30 and above the leveling layer 31, color filters 38 are formed. The leveling layer 32 is formed above the color filters 38 and micro-lenses 10 are formed above the leveling layer 32. The shapes of the photoelectric conversion units 13 and 14, defined by the openings 30d, are projected forward via the micro-lenses 10 and thus, a pair of focus detection pupils are formed. The photoelectric conversion units 13 and 14 are formed on the semiconductor circuit substrate 29. In addition, the element separation area 15 is formed in order to separate the photoelectric conversion units 13 and 14 from each other.

The image-capturing pixels 310 are designed so that their shape allows the light flux passing through the exit pupil of the fastest interchangeable lens (e.g., f 1.0) to be received in its entirety at the photoelectric conversion units 11 via the micro-lenses 10. In addition, the focus detection pixels 311 are designed so that their shape allows the pair of focus detection light fluxes passing through a pair of specific areas at the exit pupil of the interchangeable lens to be respectively received at the photoelectric conversion units 13 and 14 via the micro-lenses 10.

Figure 9:
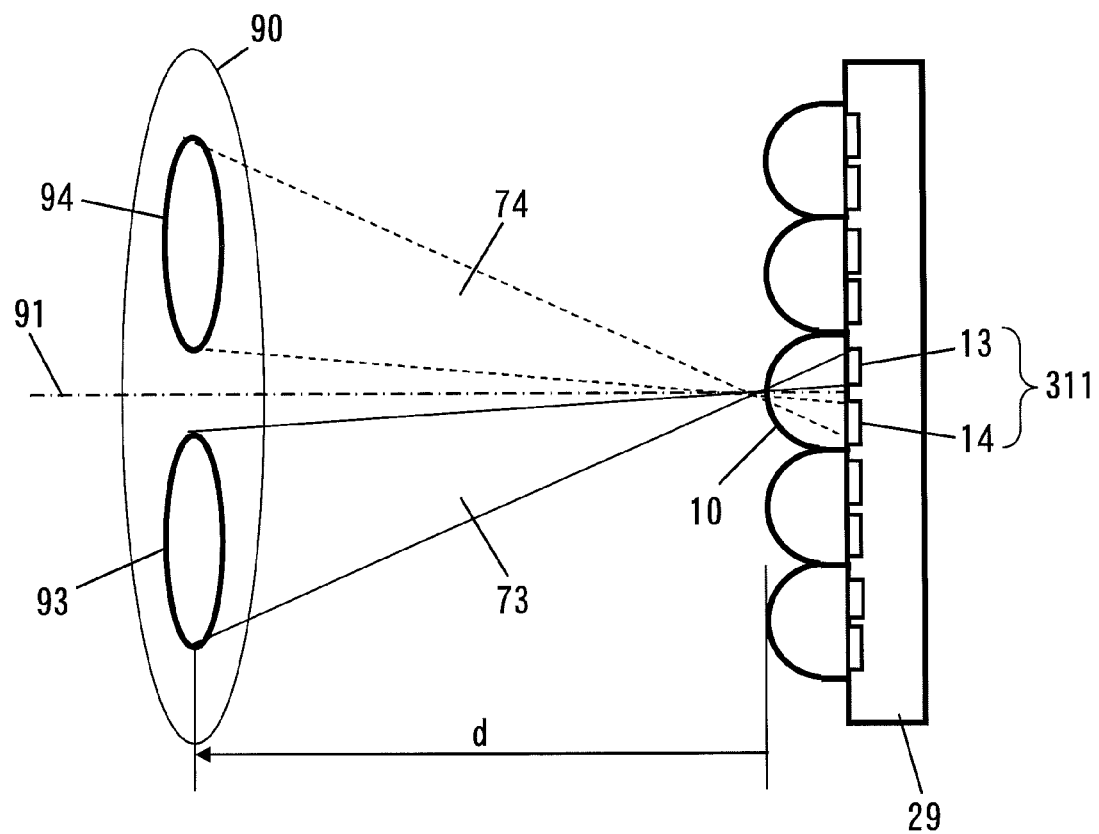
FIG. 9 shows the structure of a focus detection optical system adopting the split-pupil phase detection method.

FIG. 9 shows the structure of a focus detection optical system used to detect the focusing condition via micro-lenses 10 through the split-pupil phase detection method. It is to be noted that part of a focus detection pixel row in the focus detection area 102 is shown in an enlargement. An exit pupil 90 in FIG. 9 is set over a distance d along the frontward direction from the micro-lenses 10 disposed at the predetermined image-forming plane of the interchangeable lens 202. The distance d is determined in correspondence to the curvature of the micro-lenses 10, the refractive index of the micro-lenses 10, the distance between the micro-lenses 10 and the photoelectric conversion units 13 and 14 and the like, and is referred to as a focus detection pupil distance in this description. FIG. 9 also shows an optical axis 91 of the interchangeable lens, micro-lenses 10, photoelectric conversion units 13 and 14, focus detection pixels 311 and focus detection light fluxes 73 and 74.

A focus detection pupil 93 is formed as a photoelectric conversion unit 13, with the light receiving area thereof defined by the opening 30d is projected via the micro-lens 10. Likewise, a focus detection pupil 94 is formed as a photoelectric conversion unit 14, with the light receiving area thereof defined by an opening 30d, is projected via the micro-lens 10. The focus detection pupils 93 and 94 assume shapes achieving line symmetry relative to a vertical line passing through the optical axis 91. While the focus detection pupils 93 and 94 are shown in FIG. 9 as clearly defined areas for easier reference, the shapes of the focus detection pupils 93 and 94 are, in reality, blurred due to diffraction, since the opening diameter at the micro-lenses 10 is set to an extremely small value in correspondence to the pixel size, which is only approximately several μm.

FIG. 9 schematically illustrates five consecutive focus detection pixels 311 present near the photographic optical axis 91 within the focus detection area 102. The illustration simply provides an example, and the photoelectric conversion units at the other focus detection pixels 311 in the focus detection area 102 and the photoelectric conversion units at the focus detection pixels 311 in the focus detection areas 101 and 103 located toward the periphery of the image plane are all designed so as to receive light fluxes arriving at the respective micro-lenses from the corresponding focus detection pupils 93 and 94. The focus detection pixels 311 are arrayed in a direction matching the direction in which the pair of focus detection pupils are set side-by-side, i.e., the direction along which the pair of photoelectric conversion units are set side-by-side.

The photoelectric conversion unit 13 in a focus detection pixel structured as described above outputs a signal corresponding to the intensity of an image formed on the micro-lens 10 of the focus detection pixel 311 with the focus detection light flux 73 having passed through the focus detection pupil 93 and having advanced toward the micro-lens 10. In addition, the photoelectric conversion unit 14 outputs a signal corresponding to the intensity of an image formed on the micro-lens 10 of the focus detection pixel 311 with the focus detection light flux 74 having passed through the focus detection pupil 94 and having advanced toward the micro-lens 10.

By linearly disposing the focus detection pixels 311 structured as described above in large amounts and integrating the outputs from the photoelectric conversion units 13 and 14 at the individual focus detection pixels 311 into output groups each corresponding to one of the two focus detection pupils 93 and 94, information related to the intensity distribution of a pair of images formed on an array of focus detection pixels 311 with the focus detection light fluxes 73 and 74 passing through the focus detection pupil 93 and the focus detection pupil 94 is obtained. Image shift detection operation processing (correlation arithmetic processing, phase difference detection processing), to be detailed later, is subsequently executed by using the information thus obtained so as to detect an image shift amount representing the extent of image shift manifested by the pair of images through a method known as the split-pupil phase detection method. Then, by executing a conversion operation on the image shift amount in correspondence to the proportional relation of the focus detection pupil distance to the interval between the gravitational centers of the pair of focus detection pupils 93 and 94, the deviation (defocus amount) of the current image-forming plane (the image-forming plane at the focus detection position corresponding to the position assumed by the micro-lens array on the predetermined image-forming plane), relative to the predetermined image-forming plane, is calculated. In more specific terms, the defocus amount, i.e., the deviation of the image-forming plane relative to the predetermined image-forming plane, manifesting along the direction in which the optical axis 91 extends, is calculated by multiplying the image shift amount indicating the extent of image shift occurring within the plane ranging perpendicular to the optical axis 91 by a specific conversion coefficient. The specific conversion coefficient is a value obtained by dividing the focus detection pupil distance d by the interval between the gravitational centers of the focus detection pupils 93 and 94.

Figure 10:
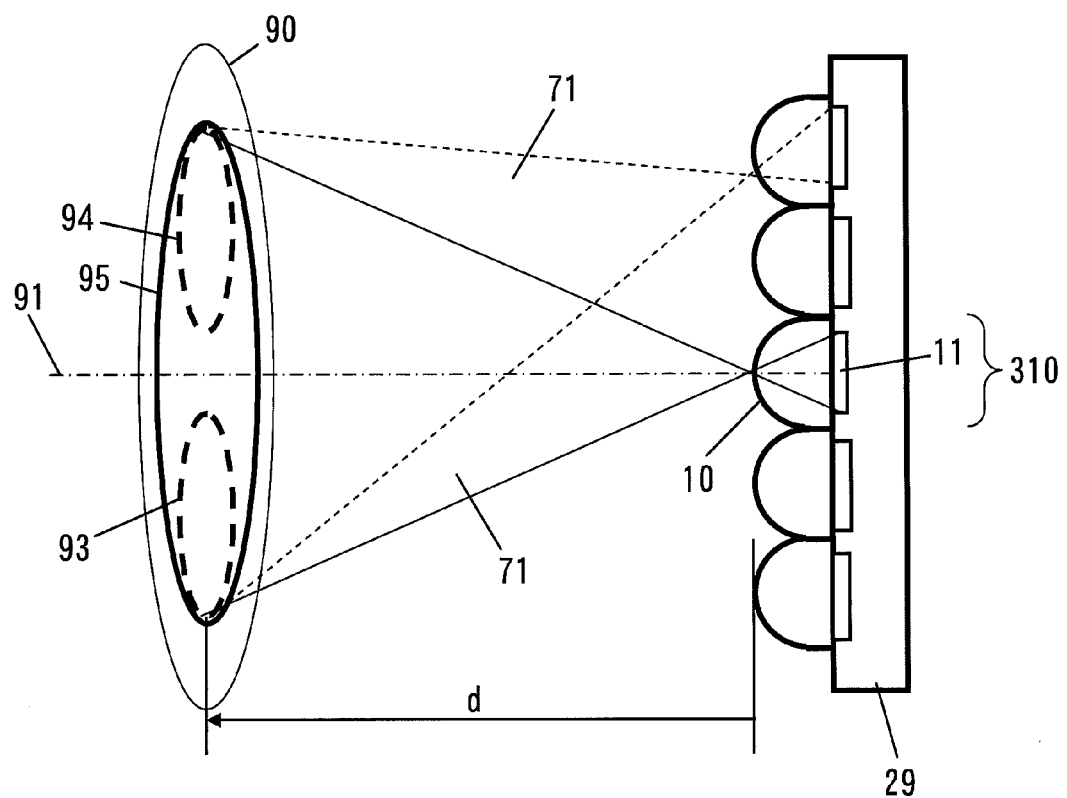
FIG. 10 illustrates how photographic light fluxes are received at image-capturing pixels.

FIG. 10, which is to be referred to in comparison to FIG. 9, shows photographic light fluxes received at image-capturing pixels 310 of the image sensor 212 shown in FIG. 4. An explanation of any illustrated items identical to those in FIG. 9 is omitted.

The image-capturing pixels 310 each include a micro-lens 10, a photoelectric conversion unit 11 disposed to the rear of the micro-lens and the like. The shape of an opening 30a (see FIG. 7) present in close proximity to the photoelectric conversion unit 11 is projected via the micro-lens 10 onto the exit pupil 90 set apart by the focus detection pupil distance d. The shape of the projected image defines an area 95 that substantially circumscribes the focus detection pupils 93 and 94. The photoelectric conversion unit 11 outputs a signal corresponding to the intensity of an image formed on the micro-lens 10 with a photographic light flux 71 having passed through the area 95 and having advanced toward the micro-lens 10.

While the defocus amount is calculated by multiplying the image shift amount by a predetermined conversion coefficient, as explained earlier, the shapes of the focus detection pupils 93 and 94, and more specifically, the manner with which their outlines become blurred, change in correspondence to the spectral characteristics of the color filter disposed at the particular focus detection pixel 311. In addition, due to the diffraction effect, the extent of such change increases as the size of the opening at the micro-lens disposed at the focus detection pixel 311 becomes smaller.

Figure 11:
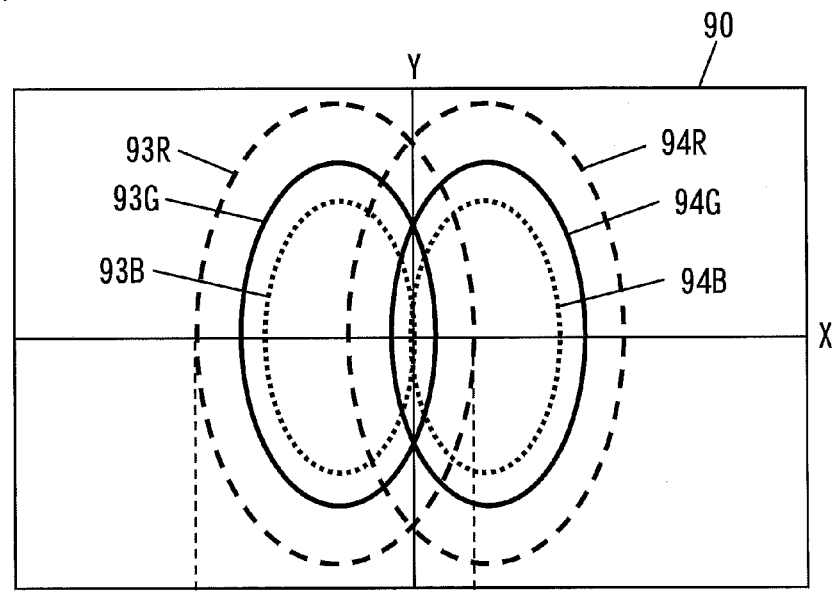
FIG. 11 illustrates how the shapes of the pair of focus detection pupils change in correspondence to the varying spectral characteristics of color filters.
Figure 11:
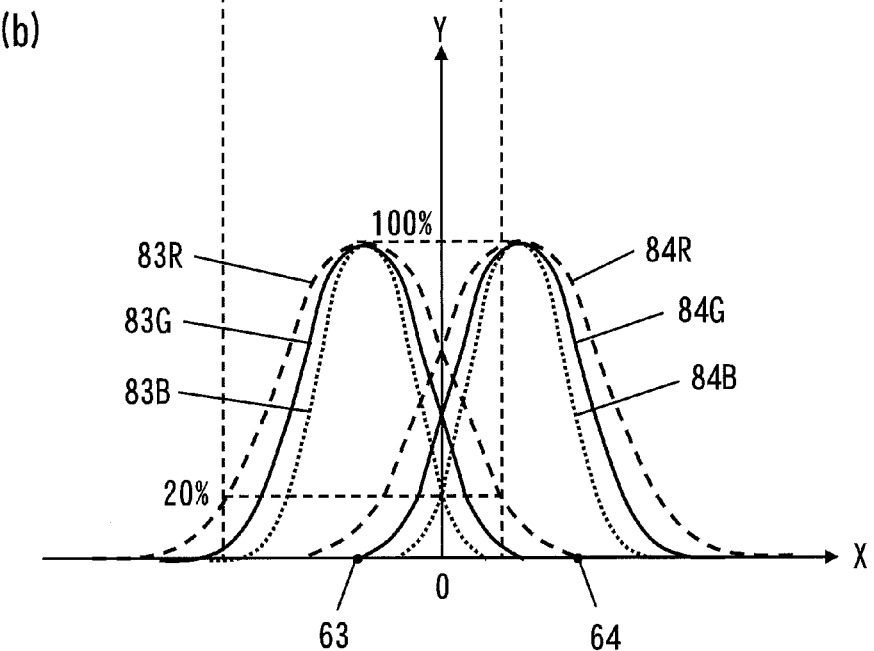

FIG. 11(a) shows how the shapes of the pair of focus detection pupils change, as viewed on the focus detection pupil plane, in correspondence to the spectral characteristics of the various color filters. Focus detection pupils 93R and 94R, focus detection pupils 93G and 94G and focus detection pupils 93B and 94B in FIG. 11(a) respectively correspond to red color filters, green color filters and blue color filters. It is to be noted that the solid lines, the dashed lines and the dotted lines indicating the shapes of the respective focus detection pupils each correspond to a predetermined range of a focus detection pupil. The predetermined range of a focus detection pupil may be, for instance, a range over which focus detection pupil distribution values, to be described later, are equal to or greater than 20% of the peak value. FIG. 11(b) shows focus detection pupil distributions corresponding to FIG. 11(a). The focus detection pupil distributions are obtained by scanning the focus detection pupils along the X axis, i.e., along the direction in which the pair of focus detection pupils are set side-by-side on the focus detection pupil plane, at a slit opening ranging along the direction perpendicular to the X axis, i.e., along the Y axis. Focus detection pupil distributions 83R and 84R correspond to the red color filters, focus detection pupil distributions 83G and 84G correspond to the green color filters and focus detection pupil distributions 83B and 84B correspond to the blue color filters. Since a greater diffraction effect is achieved via a micro-lens when the wavelength of light is greater, greater focus detection pupils and greater focus detection pupil distribution expanse are achieved with the green color filters rather than with the blue color filters and even greater focus detection pupils and focus detection pupil distribution expanse are achieved with the red color filters rather than with green color filters, as FIGS. 11(a) and 11(b) indicate.

The pairs of focus detection pupil distributions 83R and 84R, focus detection pupil distributions 83G and 84G and focus detection pupil distributions 83B and 84B each achieve line symmetry relative to the optical axis (X=0), i.e., the focus detection pupil distributions in each pair assume mirror-image shapes in relation to each other. In addition, while the shapes of the focus detection pupil distributions 83R, 83G and 83B are different from one another, they all assume a matching distribution gravitational center position 63. Furthermore, while the shapes of the focus detection pupil distributions 84R, 84G and 84B are different from one another, they all assume a substantially matching distribution gravitational center position 64.

As long as the focus detection pupil distributions 83R and 84R, the focus detection pupil distributions 83G and 84G and the focus detection pupil distributions 83B and 84B are all contained within the range of the aperture opening diameter on the plane of the exit pupil of the interchangeable lens 202, no focus detection light flux is subject to vignetting at the aperture opening and the focus detection pupil distributions achieve matching gravitational center positions. Accordingly, there is no problem in calculating the defocus amount by using a single predetermined conversion coefficient irrespective of the colors of the filters disposed at the individual focus detection pixels as has been described earlier.

However, if the focus detection light fluxes are partially vignetted at the aperture opening of the interchangeable lens 202, the focus detection pupil distributions 83R and 84R, the focus detection pupil distributions 83G and 84G and the focus detection pupil distributions 83B and 84B will be limited at the aperture opening in the periphery of the exit pupil plane.

FIG. 12(a) shows an aperture opening 96 superimposed over the focus detection pupils in FIG. 11(a). The aperture opening 96 is a round opening with a radius r, centered on the optical axis (X=Y=0). FIG. 12(b), which corresponds to FIG. 13(b), shows focus detection pupil distributions 83RV, 83GV and 83BV limited by the aperture opening 96. Since the focus detection pupil distributions 83RV, 83GV and 83BV are limited by the aperture opening 96 to a range defined by coordinate positions±r along the X axis and the Y axis, gravitational centers 63R, 63G and 63B of the individual focus detection pupil distributions are bound to assume positions different from one another. The distance from the optical axis (X=0) to the gravitational center position 63R of the focus detection pupil distribution 83RV is the smallest, the distance from the optical axis to the gravitational center position 63G of the focus detection pupil distribution 83GV is the next smallest and the distance from the optical axis to the gravitational center position 63B of the focus detection pupil distribution 83BV is the greatest.

Focus detection pupil distributions 84RV, 84GV and 84BV limited by the aperture opening 96 assume shapes achieving line symmetry (mirror-image shapes) respectively with the focus detection pupil distributions 83RV, 83GV and 83BV relative to the optical axis (X=0). For this reason, the interval between the gravitational center position 63G of the focus detection pupil distribution 83GV and the gravitational center position 64G of the focus detection pupil distribution 84GV is greater than the gravitational center interval between the gravitational center position 63R of the focus detection pupil distribution 83RV and the gravitational center position 64R of the focus detection pupil distribution 84RV. In addition, the interval between the gravitational center position 63B of the focus detection pupil distribution 83BV and the gravitational center position 64B of the focus detection pupil distribution 64BV is greater than the gravitational center interval between the gravitational center position 63G of the focus detection pupil distribution 83GV and the gravitational center position 64G of the focus detection pupil distribution 84GV. Namely, the conversion coefficient obtained by dividing the focus detection pupil distance d by the gravitational center interval between the gravitational centers of a pair of focus detection pupil distributions will take on a greatest value in correspondence to the red color filters, a second greatest value in correspondence to the green color filters and a smallest value in correspondence to the blue color filters. The difference in the level of light diffraction effect attributable to the varying spectral characteristics of color filters disposed at the focus detection pixels 311 thus affects the value taken for the conversion coefficient.

Figure 13:
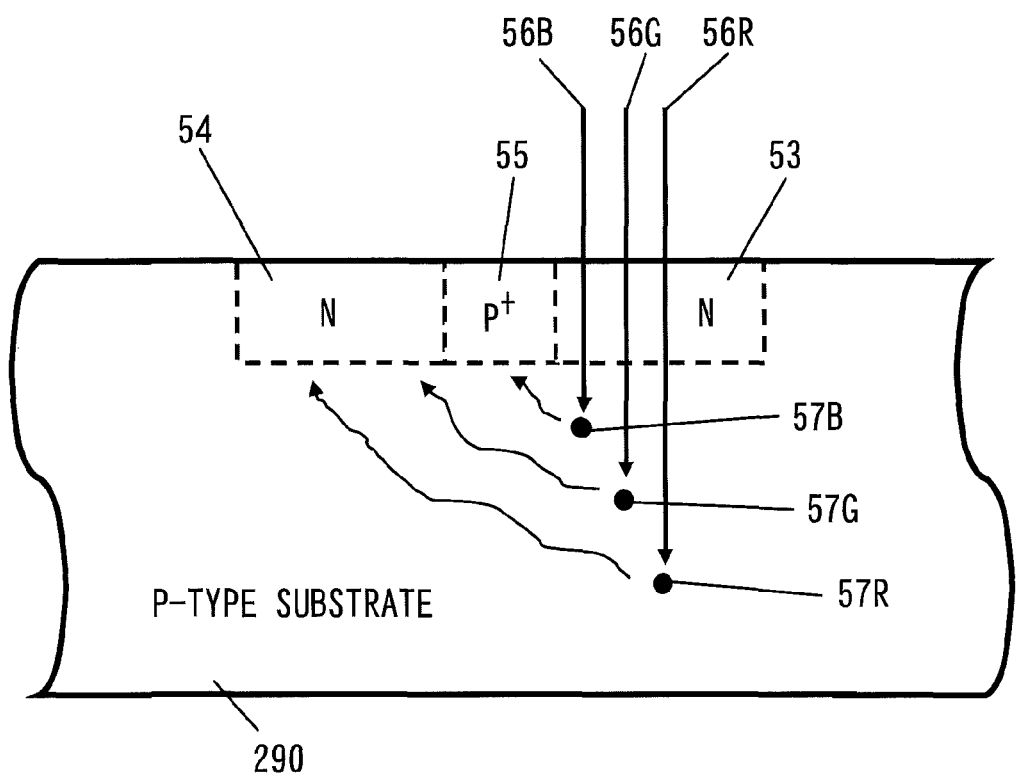
FIG. 13 is an enlarged sectional view of the pair of photoelectric conversion units in a focus detection pixel.

Next, in reference to FIG. 13, the manner with which the difference in the level of signal crosstalk attributable to the varying spectral characteristics of the color filters disposed at the focus detection pixels 311 affects the value taken for the conversion coefficient will be explained. FIG. 13 presents an enlarged sectional view of the pair of photoelectric conversion units 13 and 14 in a focus detection pixel 311. A pair of N-type areas 53 and 54 are formed at the surface of a P-type substrate 290, and a pair of photodiodes (photoelectric conversion units) are formed by the pair of N-type areas 53 and 54 and the P-type substrate. The element separation area 15 is formed with a P+ area 55 located between the pair of N-type areas 53 and 54. A red light beam 56R, a green light beam 56G and a blue light beam 56B entering the N-type area 53 assume the peak wavelengths in the spectral characteristics 600R, 600G and 600B indicated in FIG. 6. The blue light beam 56B with a relatively small wavelength generates electrons 57B at the photodiode over an area with a small depth, the red light beam 56R with a relatively large wavelength generates electrons 57R at the photodiode over an area with a great depth and the green light beam 56G with a medium wavelength generates electrons 57G at the photodiode over an area with a medium depth. While the electrons thus generated move into the N-type area, the electrons 57R having been generated at the greater depth are more likely to migrate into the adjacent N-type area 54. In comparison, the electrons 57B having been generated at the small depth, are less likely to move into the adjacent N-type area 54, and the likelihood of the electrons 57G having been generated at the medium depth migrating into the adjacent N-type area 54 is in between.

Namely, in terms of the "crosstalk rate", defined as the ratio of the number of electrons migrating to the other photoelectric conversion unit adjacent to the first photoelectric conversion unit in the pair of photoelectric conversion units formed in conjunction with a given color filter, to the entire number of electrons generated with light having passed through the color filter and entered the first photoelectric conversion unit, the crosstalk rate corresponding to the blue color filters is the lowest, the crosstalk rate corresponding to the green color filters is the second lowest and the crosstalk rate corresponding to the red color filters is the highest.

Figure 12:
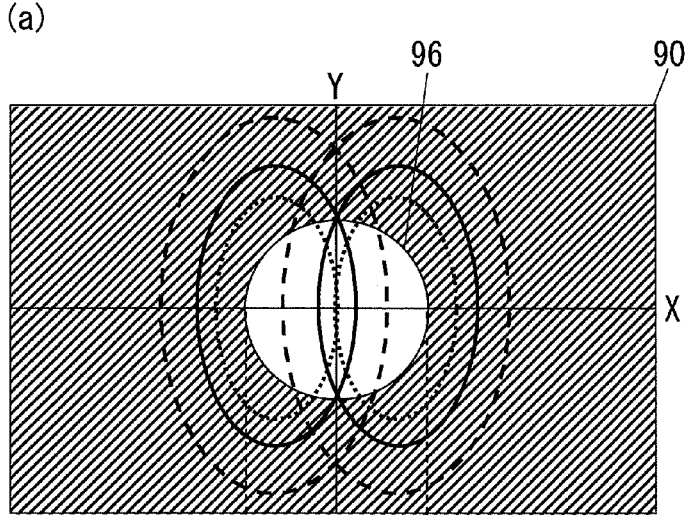
FIG. 12 shows the aperture opening superimposed over the focus detection pupils.
Figure 12:
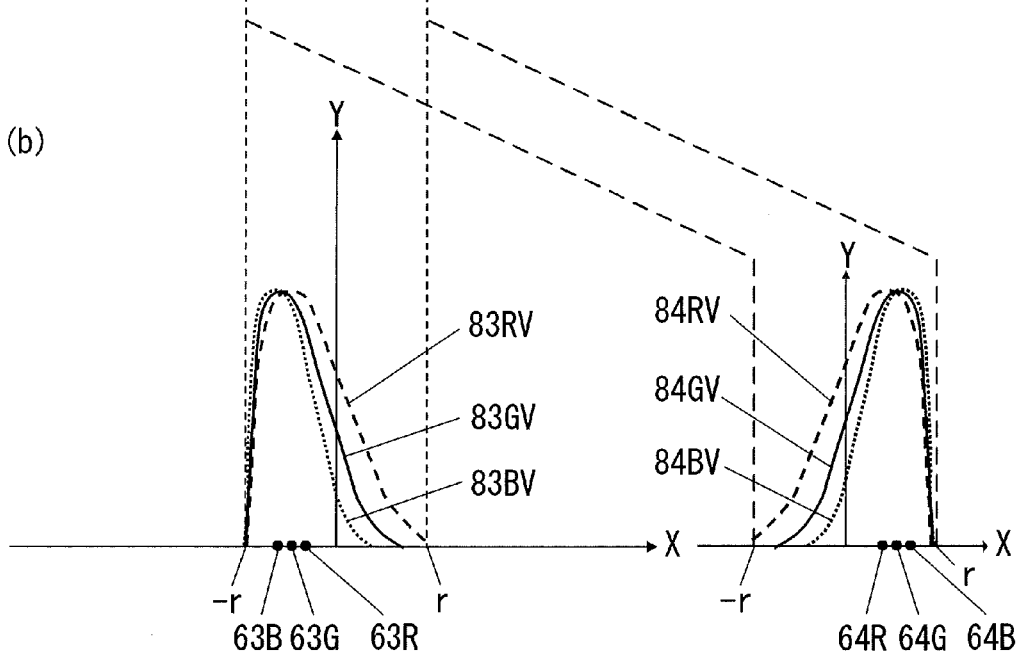

The migration of electrons, having been generated at the photoelectric conversion unit 13, to the adjacent photoelectric conversion unit 14 is equivalent to the effect with which the focus detection pupil distribution 83RV, 83GV or 83BV in FIG. 12(*b*) becomes deformed to shift from the negative range of the X axis toward the positive range of the X axis. When the crosstalk rate is higher, the extent of the deformation of the focus detection pupil distributions is greater. As the focus detection pupil distributions 83RV, 83GV or 83BV in FIG. 12(*b*) become deformed, the gravitational center positions 63R, 63G and 63B of the focus detection pupil distributions 83RV, 83GV and 83BV shift toward the point X=0. In this situation, the gravitational center position 63G corresponding to the green color filters shifts to a greater extent compared to the gravitational center position 63B corresponding to the blue color filters, and the gravitational center position 63R corresponding to the red color filters shifts to an extent greater than that of the shift of the gravitational center position 63G corresponding to the green color filters.

Accordingly, due to the electron crosstalk effect described above, the conversion coefficient obtained by dividing the focus detection pupil distance d by the gravitational center interval between the gravitational centers of the pair of focus detection pupil distributions takes on the greatest value in correspondence to the red color filters, the second greatest value in correspondence to the green color filters and the smallest value in correspondence to the blue color filters. It is to be noted that the element separation area 15 that separates the pair of photodiodes (photoelectric conversion units) 13 and 14 from each other may be formed through an isolation method such as STI (shallow trench isolation) instead of diffusion of P⁺ in the P⁺ area 55 in FIG. 13.

Figure 14:
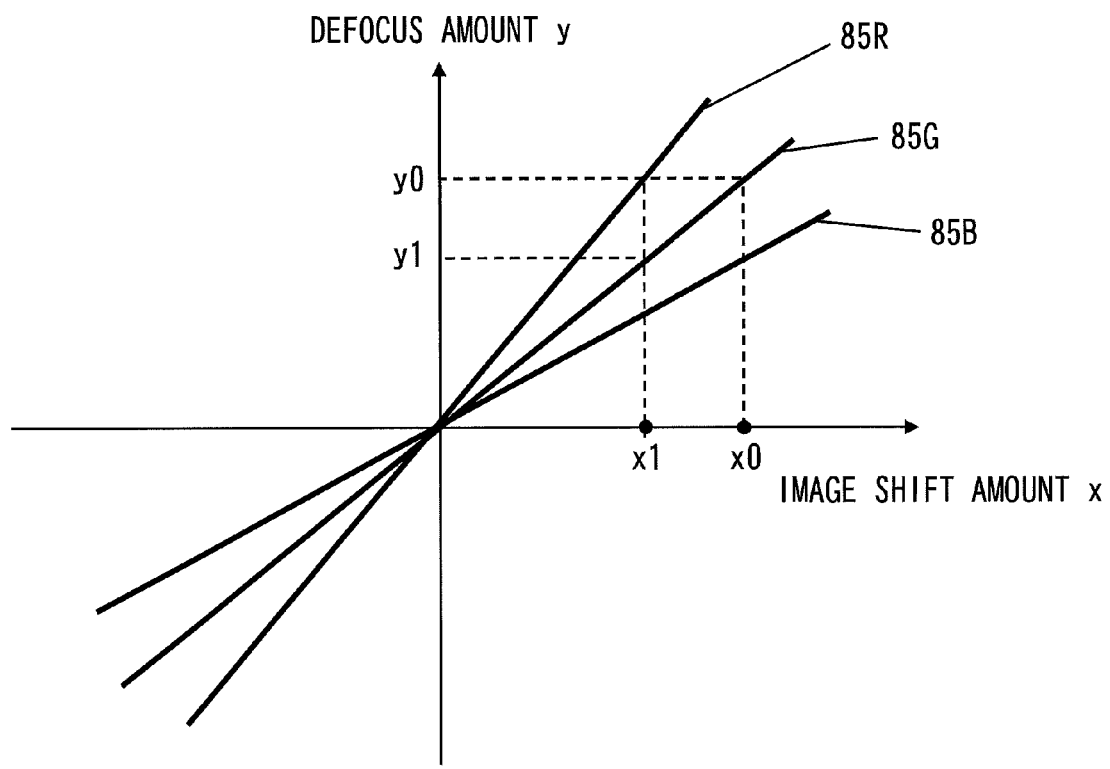
FIG. 14 indicates linear relationships between the image shift amount and the defocus amount.

FIG. 14 presents a diagram, with the image shift amount indicated along the horizontal axis (x) and the defocus amount indicated along the vertical axis (y), in reference to which the focus detection error caused by different values taken for the conversion coefficient will be explained. Straight lines 85R, 85G and 85B in FIG. 14 each represent a linear relationship between the image shift amount x detected based upon the outputs from a given type of focus detection pixels among the three different types of focus detection pixels having different color filters, i.e., red color filters, green color filters and blue color filters disposed thereat, and the defocus amount y. The lines 85R, 85G and 85B are respectively expressed as in (1) through (3) below. Conversion coefficients Kr, Kg and Kb in expressions (1) through (3) respectively correspond to the red color filters, the green color filters and the blue color filters, and Kr>Kg>Kb.

Line 85*R:* $y=Kr\cdot x$ (1)

Line 85*G:* $y=Kg\cdot x$ (2)

Line 85*B:* $y=Kb\cdot x$ (3)

When the defocus amount is at y0, image shift amounts x1 and x0 are detected based upon the outputs from focus detection pixels respectively having red color filters and green color filters disposed thereat. The defocus amount y0 is obtained by converting the image shift amount x0 detected based upon the outputs from the focus detection pixels having the green color filters disposed thereat with the conversion expression represented by the line 85G. If the image shift amount x1 detected based upon the outputs from the focus detection pixels having the red color filters dispose thereat were converted with the conversion expression represented by the line 85G, a defocus amount y1 would be obtained as the conversion result. Since the defocus amount y1 thus obtained would not match the actual defocus amount y0, an error would occur in the focus detection results.

Likewise, when the actual focusing condition manifests the defocus amount y0, a defocus amount calculated by converting the image shift amount detected based upon the outputs from the focus detection pixels having blue color filters disposed thereat with the conversion expression represented by the line 85G would not match the actual defocus amount y0, causing an error in the focus detection results.

As explained earlier, due to the light diffraction effect and the electron crosstalk effect, the conversion coefficient value changes in correspondence to the filter color, with the conversion coefficient corresponding to the red color filters taking on the greatest value, the conversion coefficient corresponding to the green color filters taking on the next greatest value and the conversion coefficient corresponding to the blue color filters taking on the smallest value. As the pixel size becomes smaller, the differences among the conversion coefficient values determined in correspondence to the individual filter colors increase. This means that if the defocus amount were calculated by using a uniform conversion coefficient regardless of the filter color, a significant focus detection error would occur.

Figure 15:
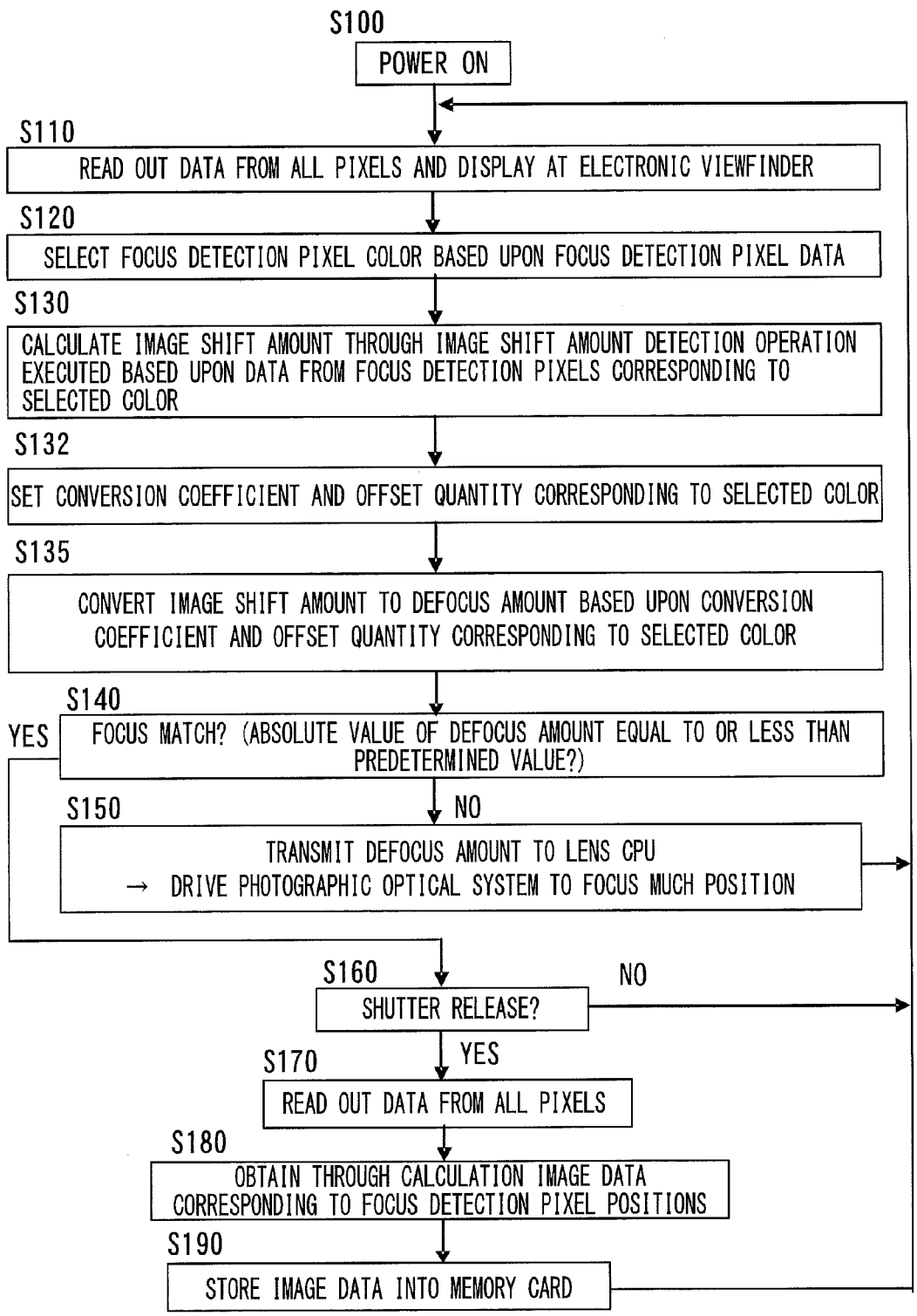
FIG. 15 presents a flowchart of an image-capturing operation, which includes the focus detection operation executed in the digital still camera.

FIG. 15 presents a flowchart of an image-capturing operation that includes the focus detection operation as part thereof, executed in the digital still camera 201 in the embodiment. As power to the digital still camera 201 is turned on in step S100, the body drive control device 214 starts the image-capturing operation to be executed in step S110 and subsequent steps. In step S110, the body drive control device 214 reads out pixel data from all the pixels, sub-samples the pixel data from the image-capturing pixels 310, i.e., the pixel data from pixels other than the focus detection pixels 311, through sub-sampling rows, and brings up on display an image expressed with the sub-sampled pixel data at the liquid crystal display element 216. In the following step S120, the body drive control device 214 selects a specific filter color to be used for purposes of focus detection, among the colors of filters disposed at the focus detection pixels 311. It is to be noted that one of the focus detection areas 101 through 103 will have been selected in advance by the photographer via a focus detection area selection member (not shown).

The color is selected as described below. In the focus detection pixel row L1 in FIG. 5, a pair of signals αGn and βGn are obtained in the form of a pair of data strings made up with data output from pairs of photoelectric conversion units 13 and 14 included in the group of focus detection pixels having the green color filters disposed thereat and a pair of signals αBn and βBn are obtained in the form of a pair of data strings made up with data output from pairs of photoelectric conversion units 13 and 14 included in the group of focus detection pixels having the blur color filters disposed thereat. In the focus detection pixel row L2, a pair of signals αHn and βHn are obtained in the form of a pair of data strings made up with data output from pairs of photoelectric conversion units 13 and 14 included in the group of focus detection pixels having the red color filters disposed thereat and a pair of signals αRn and βRn are obtained in the form of a pair of data strings made up with data output from pairs of photoelectric conversion units 13 and 14 included in the group of focus detection pixels having the blur color filters disposed therein. The affixed letter n is attached so as to indicate the position of a given focus detection pixel arrayed in a specific order in the focus detection pixel row. Contrast evaluation values γG, γB, γH and γR are then calculated respectively in correspondence to the pair of signals αGn and βGn, the pair of signals αBn and βBn, the pair of signals αHn and βHn and the pair of signals αRn and βRn. For instance, the contrast evaluation value γG for the pair of signals αGn and βGn may be calculated as expressed in (4) below by adding together the total sum of the absolute values representing two-stage differences in the signal string αGn and the total sum of the absolute values of two-stage differences in the signal string βGn. It is to be noted that the contrast evaluation values may be calculated based upon single-stage differences or based upon differences between the largest values and the smallest values instead of the two-stage differences.

$$\gamma G = \Sigma |-\alpha G_{n-1} + 2 \cdot \alpha G_n - \alpha G_{n+1}| + \Sigma |-\beta G_{n-1} + 2 \cdot \beta G_n - \beta G_{n+1}| \quad (4)$$

The body drive control device 214 selects the filter color corresponding to the contrast evaluation value that is greatest among the contrast evaluation values γG, γB, γH and γR calculated as described above. If green is selected, either the focus detection pixel row L1 or the focus detection pixel row L2 is selected. Namely, if the contrast evaluation value γG is the greatest value, the focus detection pixel row L1 is selected, whereas if the contrast evaluation value γH is the greatest value, the focus detection pixel row L2 is selected. In the image shift detection operation, which will be described later, the image shift amount can be calculated with better accuracy if the contrast in the pair of signals used in the image shift detection operation is more distinct. Accordingly, by calculating the image shift amount in conjunction with a pair of signals corresponding to the color selected based upon the contrast evaluation values as described above, the image shift amount can be determined with a high level of accuracy.

In step S130, the body drive control device 214 executes the image shift detection operation processing (correlation arithmetic processing, phase difference detection processing) as will be explained later based upon the pair of signals corresponding to the selected color among the pair of signals αGn and βGn, the pair of signals αBn and βBn, the pair of signals αHn and βHn and the pair of signals αRn and βRn, and calculates the image shift amount through this processing.

In step S132, the body drive control device 214 sets the conversion coefficient and a offset quantity corresponding to the selected color. Namely, the body drive control device 214 selects the conversion coefficient corresponding to the selected color among the conversion coefficients Kr, Kg and Kb represented by the slopes of the lines 85R, 85G and 85B corresponding to red, green and blue shown in FIG. 14. The offset quantity, which is used to correct chromatic aberration (the variance among focusing positions corresponding to the different colors), may be indicated with, for instance, the green color focusing position designated as a reference position. The offset quantity set when the selected color is red is equal to the difference between the red color focusing position and the green color focusing position. The offset quantity set when the selected color is green is 0. The offset quantity set when the selected color is blue is equal to the difference between the blue color focusing position and the green color focusing position.

In step S135, the body drive control device 214 converts the image offset quantity corresponding to the selected color to a defocus amount based upon the conversion coefficient and the shift amount set in correspondence to the selected color. The body drive control device 214 having selected, for instance, the red color conversion coefficient Kr and the red color offset quantity yr, converts a red color image shift amount x2 to a defocus amount y2, as expressed in (5) below. The defocus amount y2 indicates the extent of defocus of the green color (i.e., the reference color for the offset quantity) image plane relative to the predetermined image-forming plane.

$$y2 = Kr \cdot x2 + yr \quad (5)$$

In step S140, the body drive control device 214 makes a decision as to whether or not the current condition is close to the focus match state, i.e., whether or not the absolute value of the defocus amount having been calculated is equal to or less than a predetermined value. If it is decided that the current condition is not close to the focus match state, the processing proceeds to step S150, in which the body drive control device 214 transmits the defocus amount to the lens drive control device 206 so as to drive the focusing lens 210 in the interchangeable lens 202 to the focus match position. Subsequently, the processing returns to step S110 to repeatedly execute the operation described above. It is to be noted that the operation also branches to this step if focus detection cannot be executed. In this case, the body drive control device 214 transmits a scan-drive instruction to the lens drive control device 206 so as to scan-drive the focusing lens 210 in the interchangeable lens 202 over the range between infinity and maximum close-up. The operation then returns to step S110 to repeatedly execute the operation described above.

If, on the other hand, it is decided in step S140 that the current condition is close to the focus match state, the processing proceeds to step S160 in which the body drive control device 214 makes a decision as to whether or not a shutter release has occurred in response to an operation at a shutter release button (not shown). If it is decided that a shutter release has not occurred, the processing returns to step S110 to repeatedly execute the operation described above. If it is decided that a shutter release has occurred, the processing proceeds to step S170 in which the body drive control device 214 transmits an aperture adjustment instruction to the lens drive control device 206 so as to adjust the aperture number at the interchangeable lens 202 to a control f-number (an f-number selected either automatically or by the photographer). Once the aperture control ends, the body drive control device 214 engages the image sensor 212 in image-capturing operation and reads out image data from the image-capturing pixels 310 and all the focus detection pixels 311 in the image sensor 212.

In step S180, the body drive control device 214 obtains, through calculation, image data at positions taken by the individual focus detection pixels 311 by using the pixel data output from the focus detection pixels, i.e., by adding together the data output from the pair of photoelectric conversion units 13 and 14 disposed in each focus detection pixel. In the following step S190, the body drive control device 214 stores the pixel data, which are to be used as the image data corresponding to the image-capturing pixels 310, and the image data corresponding to the focus detection pixel positions into the memory card 219. The processing then returns to step S110 to repeatedly execute the operation described above.

In step S130 in FIG. 15, the body drive control device 214 executes the image shift detection operation processing (correlation arithmetic processing, phase difference detection processing). Since the focus detection pupils 93 and 94 may be vignetted by the aperture opening at the lens, a perfect balance may not be achieved with regard to the amounts of light in the pair of images detected via the focus detection pixels 311. Accordingly, the body drive control device 214 executes a specific type of correlation operation that allows a desired level of image shift detection accuracy to be maintained in spite of the imbalance in the amounts of light. The correlation operation is executed on a pair of signals $A1_n$ ($A1_1, \ldots, A1_M$: M represents the number of sets of data) and $A2_n$ ($A2_1, \ldots, A2_M$) read out in correspondence to each color from the focus detection pixel row L1 or L2 made up the plurality of focus detection pixels 311, as expressed in correlation operation expression (6) in the known art, disclosed in Japanese Laid Open Patent Publication No. 2007-333720, so as to calculate a correlation amount C(k). In expression (6), the E operation is cumulatively executed with regard to the variable n. The range assumed for the variable n is limited to the range over which the data $A1_n, A1_{n+1}, A2_{n+k}$ and $A2_{n+1+k}$ exist in correspondence to the image shift amount k. The shift amount k is an integer that represents a relative shift amount assuming a value taken in units matching the data interval with which the data in the signal strings constituting the pair of signals are sampled.

$$C(k)=\Sigma |A1_n \cdot A2_{n+1+k} - A2_{n+k} \cdot A1_{n+1}| \tag{6}$$

Provided that a minimum value C(X) among values taken for a continuous correlation amount C(x) in correspondence to the correlation amount C(k) calculated to take on discrete values as expressed in (6) above, i.e., the correlation operation expression of the known art, is ascertained, a shift amount X, at which the minimum value C(X) among the values of the continuous correlation amounts C(x), is achieved, is converted to an image shift amount shft as expressed in (7) below. The coefficient PY in expression (7) takes on the value twice the pixel pitch with which the focus detection pixels 311 forming the focus detection pixel row L1 or L2 are disposed, i.e., the value equal to the pixel pitch with which focus detection pixels having same-color filters disposed thereat are set.

$$shft=PY \cdot X \tag{7}$$

In the embodiment described above, image shift detection is executed in correspondence to a plurality of colors, the color in which the highest image contrast is achieved is selected, and the image shift amount corresponding to the selected color is converted to a defocus amount by using the conversion coefficient and the offset quantity corresponding to the selected color. As a result, the defocus amount can be calculated with a higher level of accuracy, regardless of which color is selected, compared to the level of accuracy of defocus amount calculation executed in the related art by using a single conversion coefficient irrespective of the filter color.

As disclosed in Japanese Laid Open Patent Publication No. 2007-333720, there is no guarantee that a minimum value C(X) can always be detected among the values taken for the continuous correlation amount C(x) in correspondence to the correlation amount C(k) taking discrete values calculated as expressed in (6), i.e., the correlation operation expression of the known art. If a minimum value C(X) cannot be ascertained, focus detection will be determined to be impossible. In addition, even when a minimum value C(X) among continuous values taken for the correlation amount C(x) is ascertained, the reliability of the shift amount X at which that particular minimum value (X) is achieved may be determined to be poor. While the color achieving the highest image contrast is selected in the flow of processing executed in the embodiment described above, the initial processing may be followed by a similar processing flow in conjunction with another color selected upon determining that focus detection is not possible or that the reliability of the shift amount X at which the minimum value C(X) is achieved is poor. For instance, a color priority order may be set in advance as; green→red→blue, and if focus detection is determined to be not possible or the reliability of the shift amount is determined to be poor after executing the initial processing in the highest priority color having been selected first, the color with the next highest priority may be selected. As an alternative, defocus amounts may be calculated in correspondence to all the colors and these defocus amounts may be averaged through weighted averaging by using the levels of reliability of image shift amount calculation as weighting coefficients.

An explanation is given above by assuming that a common conversion coefficient and a common offset quantity are used in correspondence to a given color in all the focus detection areas (focus detection positions). However, the shapes of the focus detection pupil distributions at the center of the image plane may be different from those in the periphery of the image plane, and in such a case, different conversion coefficients and different offset quantities may be used even in correspondence to the same color for the focus detection area (focus detection position) 102 located at the center of the image plane and for the focus detection areas (focus detection positions) 101 and 103 toward the periphery of the image plane.

In the example described above, a single conversion coefficient is used in correspondence to each filter color on the assumption that the aperture opening diameter at the photographic lens remains unchanged for the focus detection operation so as to simplify the description. However, it will be obvious that the conversion coefficient will need to be adjusted in correspondence to the aperture f-number at the photographic lens since the shapes of the focus detection pupil distributions are bound to change in correspondence to the aperture f-number set at the photographic lens.

Methods that may be adopted when determining the values taken for the conversion coefficients and offset quantities described above include the following.

(Method 1)

In method 1, the values for the conversion coefficients and the offset quantities are determined through calculation. The positions of the gravitational centers of the focus detection pupil distributions 83R, 84R, 83G, 84G, 83B and 84B shown in FIG. 11(b) are calculated in advance based upon the exit pupil distance at the optical system, the exit pupil diameter, the f-number, the optical design parameters for the focus detection pixels (the micro-lens diameter, the distance from the micro-lens to the photoelectric conversion units, the color filter spectral sensitivity and the like), the focus detection pupil distance, the image height of the focus detection pixels and the like. A conversion coefficient is calculated in correspondence to each filter color by dividing the interval between the gravitational centers of the corresponding pair of focus detection pupil distributions by the focus detection pupil distance. The conversion coefficients thus calculated are recorded in a lookup table in which a conversion coefficient can be looked up by entering the exit pupil distance at the optical system, the exit pupil diameter, the f-number, the focus detection pupil distance, the focus detection pixel image height, the filter color and the like as input parameters. This lookup table is stored in the body drive control device 214.

In addition, offset quantities each corresponding to a specific filter color are also calculated in advance based upon the exit pupil distance at the optical system, the exit pupil diameter, the f-number, the optical design parameters for the focus detection pixels (the micro-lens diameter, the distance from the micro-lens to the photoelectric conversion units, the color filter spectral sensitivity and the like), the focus detection pupil distance, the focus detection pixel image height and the like, and are recorded in a lookup table. This lookup table is stored in the body drive control device 214 as well.

It is to be noted that when calculating the conversion coefficients in advance, factors such as the diffraction effect (manifesting variance in the shapes of the focus detection pupil distributions among different colors) and the crosstalk effect (manifesting variance in the rates of signal crosstalk occurring between the pair of photoelectric conversion units among different colors) are taken into consideration, as has been explained earlier.

When the image shift amount is actually converted to a defocus amount, information indicating the exit pupil distance, the exit pupil diameter and the f-number is read out from the interchangeable lens currently mounted in the camera and the conversion coefficient and the offset quantity selected from the lookup tables based upon the information thus read out, the image height and the filter color at the focus detection pixels via which the focus detection has been executed, are used.

(Method 2)

In method 2, values for the conversion coefficient and the offset quantity are measured in correspondence to each interchangeable lens. Since aberrations manifesting at individual optical systems differently affect the focus detection pupil distributions, conversion coefficients are actually measured each in correspondence to a specific combination of a given optical system and a filter color at focus detection pixels, and the conversion coefficients obtained through the measurement are stored in the lens drive control device 206 of the interchangeable lens 202 in the form of a lookup table that can be referenced by entering the f-number at the optical system, the focal length, the image height and the color as parameters. The conversion coefficients are measured by calculating the ratio of the extent of change in the image shift amount relative to the extent of change in the defocus amount.

In addition, offset quantities are also measured each in correspondence to a specific combination of a given optical system and a filter color at focus detection pixels and the offset quantities thus obtained through the measurement are stored in the lens drive control device 206 of the interchangeable lens 202 in the form of a lookup table that can be referenced by entering the f-number at the optical system, the focal length, the image height and the color as parameters. When the image shift amount is actually converted to a defocus amount, the body drive control device 214 in the camera body 203 transmits information pertaining to the image height and the selected color to the lens drive control device 206 in the interchangeable lens 202 mounted in the camera body 203. In response, the lens drive control device 206 in the interchangeable lens 202 transmits the conversion coefficient and the offset quantity corresponding to the current f-number setting, the focal length, and the image height and the color indicated in the information having been received, to the body drive control device 214 in the camera body 203. The body drive control device 214 in the camera body 203 uses the conversion coefficient and the offset quantity having been received from the lens drive control device 206 in the interchangeable lens 202 in execution of the focus detection processing.

(Method 3)

In method 3, values measured for a reference optical system are used as the conversion coefficient and the offset quantity. Since it is bound to be a laborious process to measure the conversion coefficients in correspondence to various optical systems, conversion coefficients and offset quantities are measured for a reference optical system by using the f-number, the exit pupil distance, the image height and the color as parameters, as in method 2, and the conversion coefficients and the offset quantities thus measured are stored in the form of tables. These tables are stored in the body drive control device 214 at the camera body 203. When the body drive control device 214 in the camera body 203 actually converts the image shift amount to a defocus amount, it reads out information indicating the f-number and the exit pupil distance from the interchangeable lens mounted at the camera and the conversion coefficient and the offset quantity selected from the tables stored in the body drive control device 214 at the camera body 203 based upon the information having been read out, the focus detection pixel image height and the filter color are used in the conversion operation.

The focus detection device achieved in the embodiment, which is included in the digital still camera 201, includes the image sensor 212 having the focus detection pixel rows L1 and L2 disposed thereat and the body drive control device 214. The focus detection pixel row L1 is made up with a plurality of focus detection pixels 311 having green color filters 38 disposed thereat and a plurality of focus detection pixels 311 having blue color filters 38 disposed thereat. The plurality of focus detection pixels 311 each having a green color filter 38 disposed thereat output a pair of signals $\alpha Gn$ and $\beta Gn$ to be used in split-pupil phase difference detection. The plurality of focus detection pixels 311 each having a blue color filter 38 disposed thereat output a pair of signals $\alpha Bn$ and $\beta Bn$ to be used in split-pupil phase detection. The focus detection pixel row L2 is made up with a plurality of focus detection pixels 311 having green color filters 38 disposed thereat and a plurality of focus detection pixels 311 having red color filters 38 disposed thereat. The plurality of focus detection pixels 311 each having a green color filter 38 disposed thereat output a pair of signals $\alpha Hn$ and $\beta Hn$ to be used in split-pupil phase detection. The plurality of focus detection pixels 311 each having a red color filter 38 disposed thereat output a pair of signals $\alpha Rn$ and $\beta Rn$ to be used in split-pupil phase detection.

The body drive control device 214 sets the conversion coefficient Kg corresponding to green color, the conversion coefficient Kb corresponding to blue color and the conversion coefficient Kr corresponding to red color. The body drive control device 214 detects the phase difference, i.e., the image shift amount, manifested by the pair of signals that correspond to the contrast evaluation value taking the greatest value among the contrast evaluation values $\gamma G$, $\gamma B$, $\gamma H$ and $\gamma R$ respectively corresponding to the pair of signals $\alpha Gn$ and $\beta Gn$, the pair of signals $\alpha Bn$ and $\beta Bn$, the pair of signals $\alpha Hn$ and $\beta Hn$ and the pair of signals $\alpha Rn$ and $\beta Rn$. The body drive control device 214, having detected the image shift amount indicating the image shift manifested by the pair of the signals αGn and βGn calculates the defocus amount by multiplying the conversion coefficient Kg by the detected image shift amount, the body drive control device 214, having detected the image shift amount indicating the image shift manifested by the pair of the signals αBn and βBn calculates the defocus amount by multiplying the conversion coefficient Kb by the detected image shift amount, the body drive control device 214, having detected the image shift amount indicating the image shift manifested by the pair of the signals αHn and βHn calculates the defocus amount by multiplying the conversion coefficient Kg by the detected image shift amount, and the body drive control device 214, having detected the image shift amount indicating the image shift manifested by the pair of the signals αRn and βRn, calculates the defocus amount by multiplying the conversion coefficient Kr by the detected image shift amount. Through these measures, the focus detection device is able to execute highly accurate focus detection that is unaffected by the effects of different colors of light.

—Variations—

While the image sensor 212 in the embodiment described above is configured with a plurality of image-capturing pixels 310 and the focus detection pixel rows L1 and L2, made up with a plurality of focus detection pixels, as shown in FIG. 4 and FIG. 5, the image sensor 212 may be configured with a plurality of image-capturing pixels 310 and either the focus detection pixel row L1 or the focus detection pixel row L2 instead. In the image sensor 212 that does not include the focus detection pixel row L2, i.e., the image sensor 212 configured with a plurality of image-capturing pixels 310 and the focus detection pixel row L1, a pair of signals αGn and βGn pair of signals αBn and βBn are output in the focus detection pixel row L1 for purposes of split-pupil phase detection.

The body drive control device 214 sets the conversion coefficient Kg corresponding to green and the conversion coefficient Kb corresponding to blue. The body drive control device 214 detects the phase difference, i.e., the image shift amount, manifested by the pair of signals corresponding to the greater contrast evaluation value, of the contrast evaluation values γG and γB respectively corresponding to the pair of signals αGn and βGn and the pair of signals αBn and βBn. The body drive control device 214, having detected the image shift amount corresponding to the pair of signals αGn and βGn, calculates the defocus amount by multiplying the conversion coefficient Kg by the detected image shift amount, whereas upon detecting the image shift amount corresponding to the pair of signals αBn and βBn, it calculates the defocus amount by multiplying the conversion coefficient Kb by the detected image shift amount.

In steps S120 and S130 in FIG. 15, in reference to which the embodiment has been described, the body drive control device 214 calculates the image shift amount based upon the pair of signals indicating the greatest contrast evaluation value. However, the body drive control device 214 may select a pair of signals satisfying a condition other than the condition of achieving the greatest contrast evaluation value and detect the image shift manifested by the selected pair of signals. For instance, the digital still camera 201 may include a light source color detection sensor capable of estimating a light source color. The body drive control device 214 in this digital still camera calculates the image shift amount based upon a pair of signals output via a plurality of focus detection pixels 311 having disposed thereat color filters 38, the color of which corresponds to the light source color estimated by the light source color detection sensor, among the plurality of focus detection pixels 311 in the focus detection pixel rows L1 and L2.

As described above, the body drive control device 214 may select a pair of signals satisfying an alternative condition other than the condition of achieving the greatest contrast evaluation value and detect the image shift manifested by the pair of signals thus selected. For instance, assuming that the average output value of a plurality of imaging signals, output from a plurality of image-capturing pixels having green color filters disposed thereat, among the plurality of image-capturing pixels 310 disposed around the focus detection pixel rows L1 and L2, is greater than both the average output value of a plurality of imaging signals output from a plurality of image-capturing pixels having blue color filters disposed thereat and the average output value of a plurality of imaging signals output from a plurality of image-capturing pixels having red color filters disposed thereat, the body drive control device 214 may select the pair of signals output from the plurality of focus detection pixels 311 with green color filters 38 disposed thereat and detects the image shift manifested by the pair of signals thus selected.

As described above, the body drive control device 214 may select a pair of signals satisfying an alternative condition other than the condition of achieving the greatest contrast evaluation value and detect the image shift manifested by the pair of signals thus selected. For instance, if an optical system color filter corresponding to the green color is mounted at the interchangeable lens 202, the body drive control device 214 may read out, through communication, information indicating that the particular optical system color filter corresponds to green color. The body drive control device 214 may then select the pair of signals output from the plurality of focus detection pixels 311 with green color filters 38 disposed thereat, i.e., filters in a color matching the color of the optical system color filter indicated in the information having been read out, and detect the image shift manifested by the pair of signals thus selected.

Figure 16:
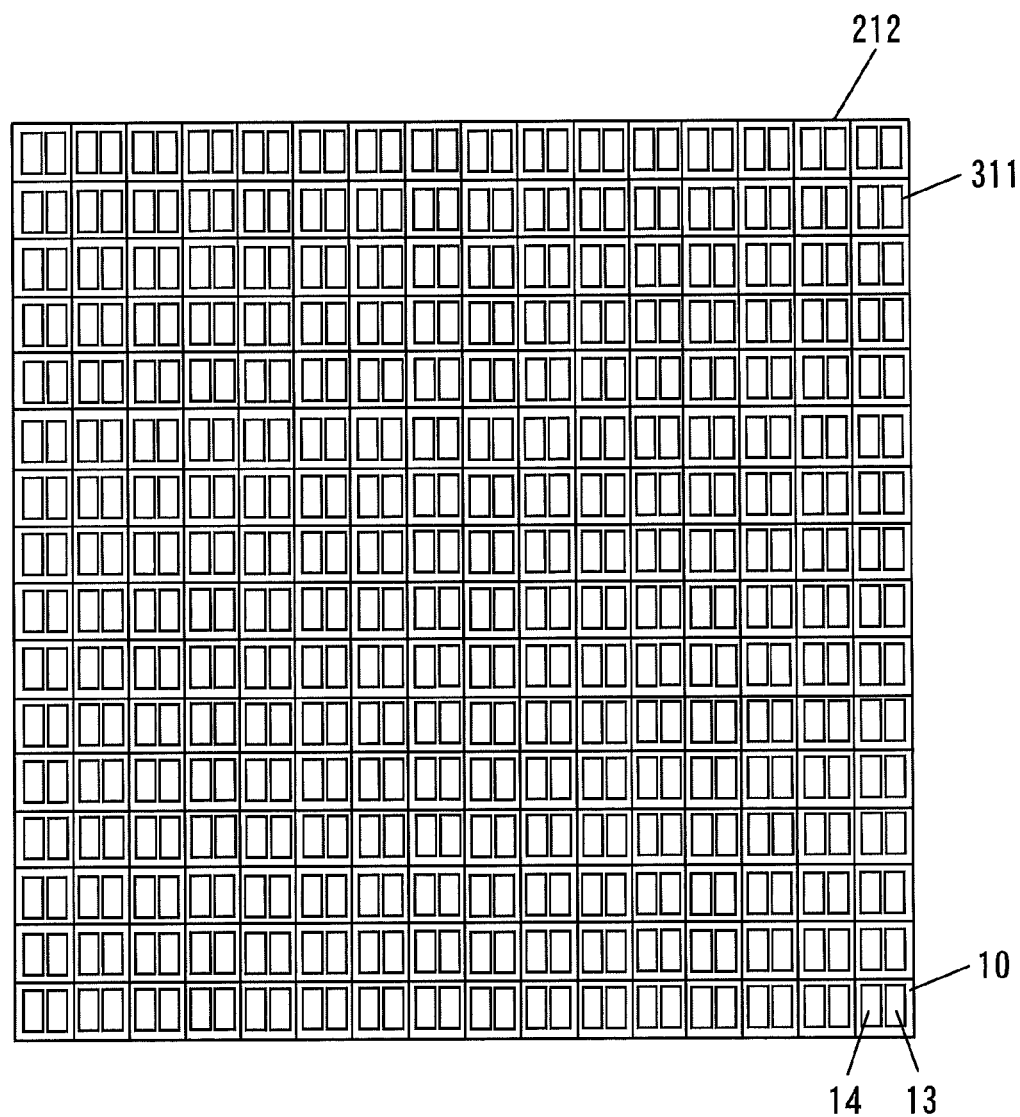
FIG. 16 shows in detail the structure of an image sensor in a front view.

In the embodiment described above, the focus detection pixels 311 are disposed in place of image-capturing pixels 310 in part of the two-dimensional array of image-capturing pixels 310 so as to form the focus detection pixel rows L1 and L2, as shown in FIG. 4 and FIG. 5. Since data equivalent to the data output from the photoelectric conversion unit 11 of an image-capturing pixel 310 can be obtained by adding together the data output from the pair of photoelectric conversion units 13 and 14 in a focus detection pixel 311, the image sensor 212 may be entirely configured with focus detection pixels 311 as illustrated in FIG. 16. FIG. 16 shows focus detection pixels 311 disposed in an area of the image sensor 212 in an enlarged view, and color filters are disposed at the individual focus detection pixels 311 in the Bayer array arrangement, as indicated in FIG. 5.

With the image sensor 212 with the focus detection pixels 311 disposed over the entire surface thereof, as shown in the figure, focus detection can be executed at any position on the photographic image plane. In addition, during an image-capturing operation, image data can be generated simply by adding together the data output from the pair of photoelectric conversion units 13 and 14 in each focus detection pixel 311.

Figure 17:
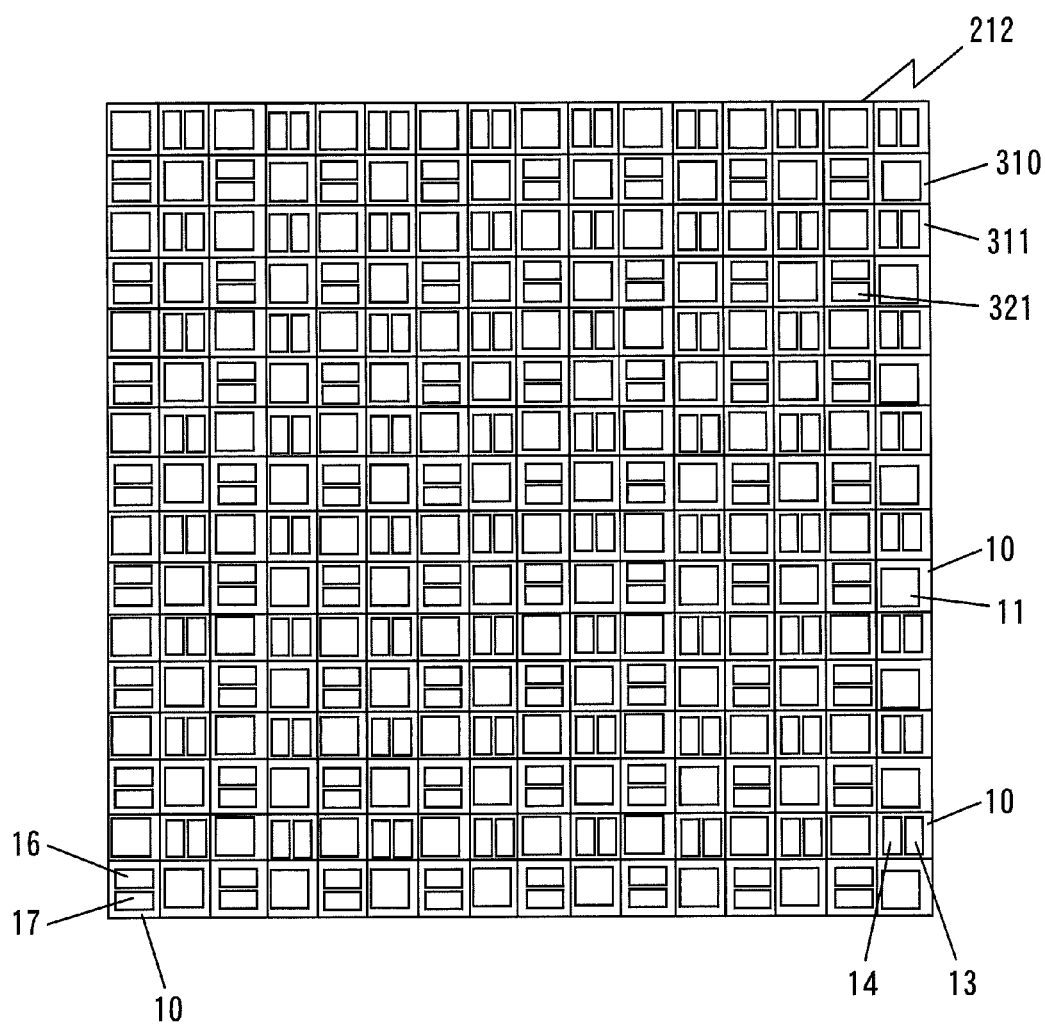
FIG. 17 shows in detail the structure of an image sensor in a front view.

FIG. 17 presents an example of a variation for the pixel layout that may be adopted in conjunction with the color filter array shown in FIG. 5. Green color filters are each disposed at an image-capturing pixel 310, whereas blue color filters are each disposed at a focus detection pixel 311. Focus detection pixels 321 each assume a structure that includes a pair of photoelectric conversion units 16 and 17 achieved by rotating the pair of photoelectric conversion units in a focus detection pixel 311 by 90°. A red color filter is disposed at the focus detection pixel 321.

In the image sensor structured as described above, an image shift manifesting along the horizontal direction is detected via focus detection pixels 311 having the blue color filters disposed thereat, and an image shift manifesting along the vertical direction is detected via focus detection pixels 321 having the red color filters disposed thereat. In addition, since the data output from the image-capturing pixels 310 correspond to the green color, which is directly connected to the brightness component, a level of brightness resolution, comparable to that of an image sensor configured entirely with image-capturing pixels is achieved and thus, high-quality image data can be generated. It is to be noted that even an image sensor 212 having all the image-capturing pixels 310 in FIG. 17 replaced with focus detection pixels 311 and focus detection pixels 321, so as to achieve an array configured with focus detection pixels 311 and focus detection pixels 321 disposed at alternate positions, satisfies the basic requirements that will allow adoption of the present invention in conjunction therewith.

As shown in FIG. 5, the color filters are disposed in a Bayer array and the focus detection pixel rows L1 and L2 are formed by disposing focus detection pixels 311 in place of image-capturing pixels 310 in part of the two-dimensional array of image-capturing pixels 310 in the embodiment described above. As an alternative, only green color filters may be disposed in the focus detection pixel row L1 and only red color filters may be disposed in the focus detection pixel row L2, as shown in FIG. 18. In this case, the array pitch with which focus detection pixels having same-color filters disposed thereat are set is reduced to half that in FIG. 5, making it possible to achieve an improvement in the focus detection accuracy. During an image-capturing operation, image data equivalent to data that would be output from the image-capturing pixels with blue color filters disposed thereat, which would otherwise take up the positions occupied by some of the focus detection pixels in the focus detection pixel row L1, are generated through interpolation executed based upon the data output from the image-capturing pixels disposed in image-capturing pixel rows L3 and L5 having blue color filters disposed thereat. In addition, image data equivalent to data that would be output from the image-capturing pixels with green color filters disposed thereat, which would otherwise take up the positions occupied by some of the focus detection pixels in the focus detection pixel row L2, are generated through interpolation executed based upon the data output from the image-capturing pixels disposed in image-capturing pixel rows L4 and L5 having green color filters disposed thereat.

In the embodiment described above, the focus detection pixels 311 each include a pair of photoelectric conversion units 13 and 14. However, the present invention may be adopted in conjunction with focus detection pixel rows L1 and L2 made up with focus detections pixels 313 each having only one of the pair of photoelectric conversion units 13 and 14, i.e., the photoelectric conversion unit 13 alone, and focus detection pixels 314 each having the other photoelectric conversion unit 14 alone in the pair of photoelectric conversion units 13 and 14, disposed at alternate positions, as shown in FIG. 19.

Figure 19:
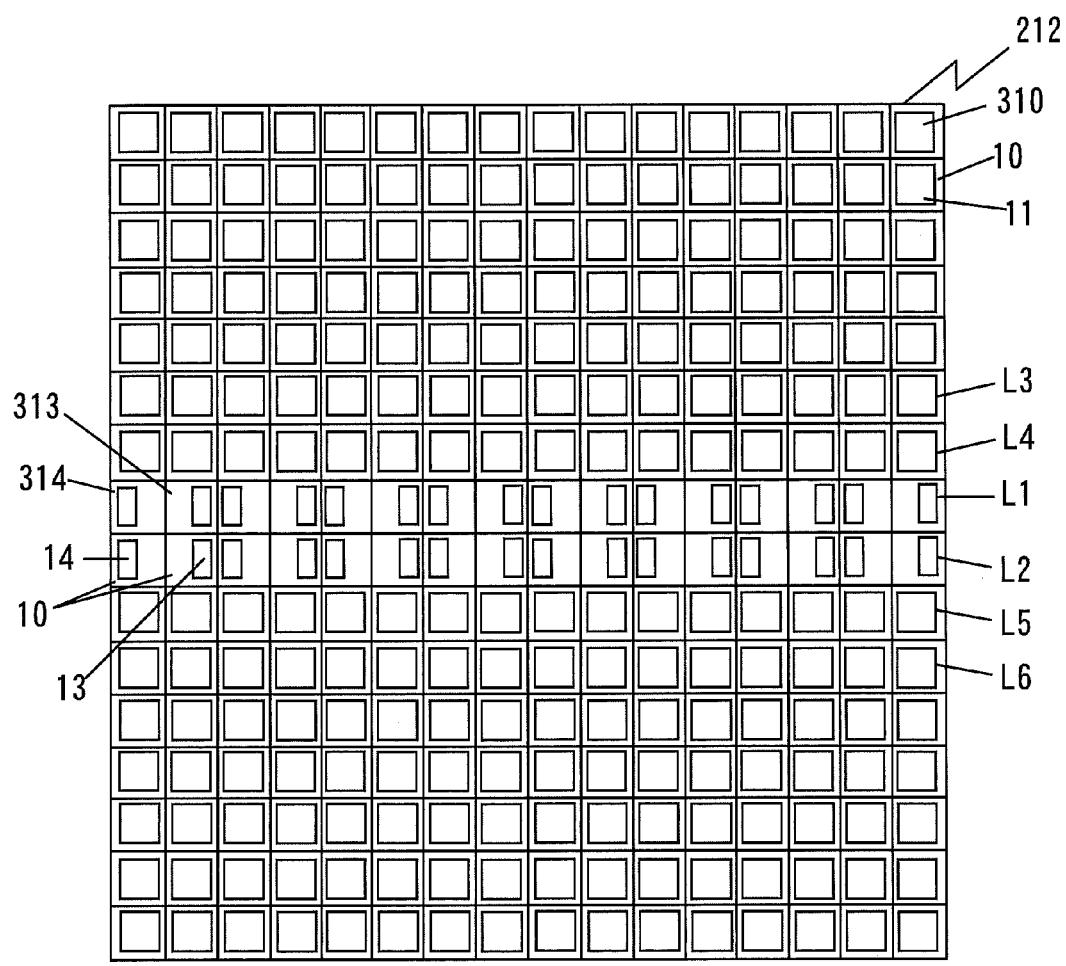
FIG. 19 shows in detail the structure of an image sensor in a front view.

A focus detection pixel 313 includes a rectangular micro-lens 10, the photoelectric conversion unit 13 with the light receiving area thereof restricted by the light-shielding mask to be described later, and a color filter (not shown), as shown in FIG. 19. The photoelectric conversion unit 13 with the light receiving area thereof restricted by the light-shielding mask assumes a rectangular shape. In addition, a focus detection pixel 314 includes a rectangular micro-lens 10, the photoelectric conversion unit 14 with the light receiving area thereof defined by a light-shielding mask to be described later, and a color filter (not shown), as shown in FIG. 19. The photoelectric conversion unit 14 with the light receiving area thereof restricted by the light-shielding mask assumes a rectangular shape. If the focus detection pixel 313 and the focus detection pixel 314 are stacked one on top of the other by aligning their micro-lenses 10, the photoelectric conversion units 13 and 14, with the light receiving areas thereof restricted by the light-shielding mask are set next to each other along the horizontal direction.

Figure 20:
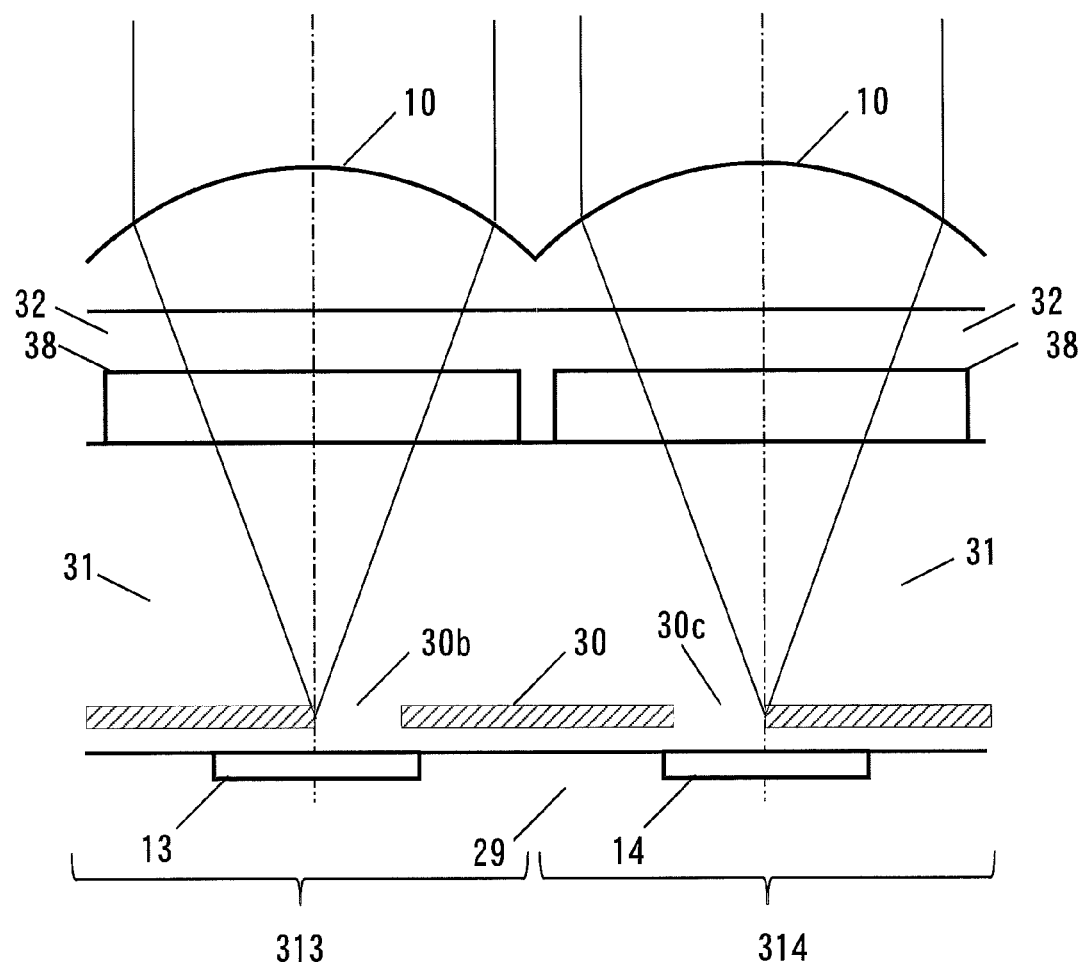
FIG. 20 shows focus detection pixels in a sectional view.

FIG. 20 is a sectional view of the focus detection pixel 313 and the focus detection pixel 314. A light-shielding mask 30 is formed in close proximity to and above the photoelectric conversion units 13 and 14 utilized for focus detection in the focus detection pixels 313 and 314. The photoelectric conversion units 13 and 14 respectively receive light having passed through opening portions 30*b* and 30*c* in the light-shielding mask 30. A leveling layer 31 is formed above the light-shielding mask 30, and color filters 38 are formed above the leveling layer 31. A leveling layer 32 is formed above the color filters 38, and micro-lenses 10 are formed above the leveling layer 32. The shapes of the openings 30*b* and 30*c* are projected forward onto a pair of focus detection pupils 93 and 94 via the micro-lenses 10. The photoelectric conversion units 13 and 14 are formed on a semiconductor circuit substrate 29.

Figure 21:
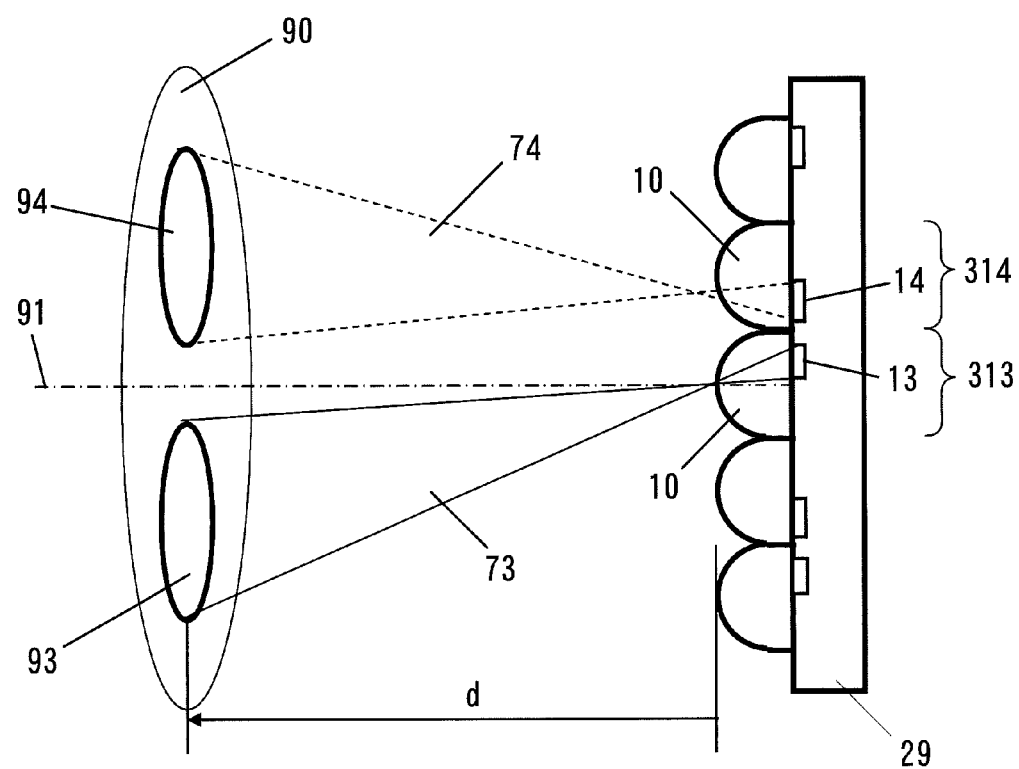
FIG. 21 shows the structure of a focus detection optical system adopting the split-pupil phase detection method.

FIG. 21 shows the structure of a focus detection optical system used to execute focus detection via the focus detection pixels 313 and 314 by adopting the split-pupil phase detection method. An exit pupil 90 in FIG. 21 is set at a position to the front of the micro-lenses and set apart from them by the focus detection pupil distance d. The micro-lenses 10 are disposed near a predetermined image-forming plane of the interchangeable lens 202. Focus detection pupils 93 and 94 are formed as the shapes of the openings 30*b* and 30*c* formed in close proximity to the photoelectric conversion elements 13 and 14 are projected via the micro-lenses 10 onto the exit pupil 90 set apart from the micro-lenses 10 by the focus detection pupil distance d. The photoelectric conversion unit 13 outputs a signal corresponding to the intensity of an image formed on the corresponding micro-lens 10 with a light flux 73 having passed through the focus detection pupil 93 and having advanced toward the micro-lens 10 at the focus detection pixel 313. In addition, the photoelectric conversion unit 14 outputs a signal corresponding to the intensity of an image formed on the corresponding micro-lens 10 with a light flux 74 having passed through the focus detection pupil 94 and having advanced toward the micro-lens 10 at the focus detection pixel 314.

FIG. 19 shows how the image-capturing pixels 310 and the focus detection pixels 313 and 314 are laid out. The focus detection pixels 313 and 314 are disposed at alternate positions in the focus detection pixel rows L1 and L2. Color filters are disposed at the image-capturing pixels 310 and the focus detection pixels 313 and 314 in FIG. 19 in the pattern indicated in FIG. 18. Namely, color filters are disposed at the image-capturing pixels 310 in the Bayer array pattern, green color filters are disposed at the focus detection pixels 313 and 314 in the focus detection pixel row L1, and red color filters are disposed at the focus detection pixels 313 and 314 in the focus detection pixel row L2. Based upon the data output from the focus detection pixels 313 and 314 disposed in the focus detection pixel row L1, an extent of image shift manifested by the pair of images corresponding to the green color is calculated. In addition, based upon the data output from the focus detection pixels 313 and 314 disposed in the focus detection pixel row L2, an extent of image shift manifested by the pair of images corresponding to the red color is calculated. During an image-capturing operation, image data equivalent to data that would be output from the image-capturing pixels with green color filters and blue color filters disposed thereat, which would otherwise take up the positions occupied by the focus detection pixels in the focus detection pixel row L1, are generated through interpolation executed based upon the data output from the image-capturing pixels disposed in image-capturing pixel rows L3 and L5, with green color filters and blue color filters disposed thereat. In addition, image data equivalent to data that would be output from the image-capturing pixels with green color filters and red color filters disposed thereat, which would otherwise take up the positions occupied by the focus detection pixels in the focus detection pixel row L2, are generated through interpolation executed based upon the data output from the image-capturing pixels disposed in image-capturing pixel rows L4 and L6, with green color filters and red color filters disposed thereat.

Figure 22:
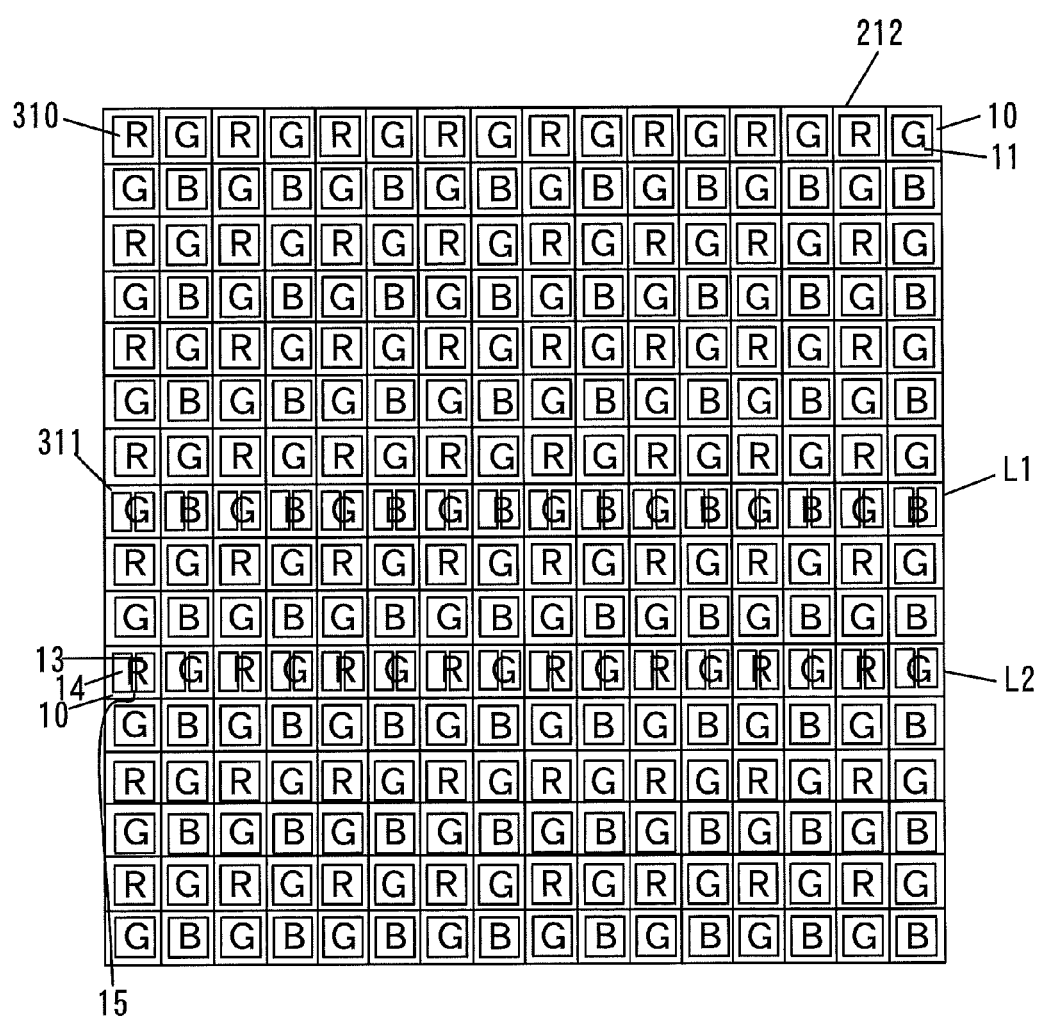
FIG. 22 shows in detail the structure of an image sensor in a front view.

FIG. 22 presents an example of a variation for the pixel layout that may be adopted in conjunction with the color filter array shown in FIG. 5. Focus detection pixel rows L1 and L2 are included in a single focus detection position 101, 102 or 103. The focus detection pixel rows L1 and L2 are not adjacent to each other, and a plurality of image-capturing pixels 310 are disposed over two lines present between the focus detection pixel row L1 and the focus detection pixel row L2. The focus detection pixel row L1 includes focus detection pixels 311 having green color filters disposed thereat and focus detection pixels 311 having blue color filters disposed thereat. The focus detection pixel row L2 includes focus detection pixels 311 having red color filters disposed thereat and focus detection pixels 311 having green color filters disposed thereat. The present invention may be adopted in a focus detection device such as this, which includes the focus detection pixel rows L1 and L2 set apart from each other.

If the focus detection pixel rows L1 and L2 are formed at each of two different focus detection positions among the focus detection positions 101, 102 and 103, the photographer selects a focus detection position so as to determine specific focus detection pixel data, output from the plurality of focus detection pixels 311 in the corresponding focus detection pixel rows, to be used for purposes of focus detection. The photographer selects in advance either of the two focus detection positions via a focus detection area selection member (not shown), and the body drive control device 214 executes focus detection by using the pixel data output from the plurality of focus detection pixels 311 in the focus detection pixel rows formed at the selected focus detection position.

In the image sensor 212 achieved in the embodiment described above, the image-capturing pixels 310 and the focus detection pixels 311 each include a color filter 38, as shown in FIG. 7 and FIG. 8. As an alternative, different color filters, each to cover a plurality of image-capturing pixels 310 or a plurality of focus detection pixels 311 in a batch, may be disposed, instead of the color filters 38 each disposed in correspondence to one of the pixels.

While the image sensor 212 achieved in the embodiment described above includes color filters disposed at the image-capturing pixels thereof in the Bayer array pattern, the structures of such color filters and the array pattern of the color filters are not limited to those in the embodiment. The present invention may be adopted in conjunction with an array of complementary color filters (green: G, yellow: Ye and magenta: Mg, cyan: Cy) or in conjunction with an arrangement other than the Bayer array.

While various color filters are disposed at the individual focus detection pixels in the embodiment described above, the focus detection pixels configuring the focus detection device according to the present invention do not necessarily need to include color filters disposed thereat. For instance, the present invention may also be adopted in a focus detection device configured with focus detection pixels such as those achieved in the fourth embodiment of the invention disclosed in Japanese Laid Open Patent Publication No. 2008-28105, as illustrated in FIGS. 30 through 35 thereof, via each of which data corresponding to the red color, the green color and the blue color can be generated by differentiating electrons generated with incoming light beams at different positions along the depth of the photodiode, thus outputting discriminated data.

While the image-capturing pixels and the focus detection pixels are disposed together on the image sensor achieved in the embodiment described above, the present invention may be adopted in a configuration that includes a mirror disposed in the optical path, via which light fluxes are separated to be directed to an image sensor constituted with image-capturing pixels alone and to a focus detection element constituted with focus detection pixels alone.

It is to be noted that an image-capturing apparatus equipped with the focus detection device according to the present invention is not limited to the digital camera 201, with the interchangeable lens 202 mounted at the camera body 203, as described above. For instance, the present invention may instead be adopted in a focus detection device included in a digital camera with an integrated lens, a film still camera or in a video camera. Furthermore, it may also be adopted in a focus detection device included in a compact camera module built into a mobile telephone or the like, in a visual recognition device in a surveillance camera or a robotic optical system, a vehicular onboard camera or the like.

The disclosure of the following priority application is herein incorporated by reference: Japanese Patent Application No. 2012-182497 (filed on Aug. 21, 2012)

REFERENCE SIGNS LIST 10, 112 micro-lens
11, 13, 14, 16, 17 113, 114 photoelectric conversion unit
15 element separation area
29 semiconductor circuit substrate
30 light-shielding mask
31, 32 leveling layer
38 color filter
53, 54 N-type area
55 $P^+$ area
63, 64 distribution gravitational center position
71 photographic light flux
73, 74 focus detection light flux
90 exit pupil
91 optical axis
93, 94, 123, 124 focus detection pupil
95 area
96 aperture opening
100 photographic image plane
101, 102, 103 focus detection position
110 image-capturing plane
111, 311, 313, 314, 321 focus detection pixel
120 focus detection pupil plane
133, 134 focus detection pupil distribution
135 overlapping area 201 digital still camera
202 interchangeable lens
203 camera body
204 mount unit
206 lens drive control device
208 zooming lens
209 lens
210 focusing lens
211 aperture
212 image sensor
213 electrical contact point
214 body drive control device
215 liquid crystal display element drive circuit
216 liquid crystal display element
217 eyepiece lens
219 memory card
290 P-type substrate
310 image-capturing pixel

The invention claimed is:

1. A focus detection device, comprising:
a plurality of first pixels having first color filters corresponding to a first color disposed thereat, via which a pair of first signals, to be used for split-pupil phase detection, are output;
a plurality of second pixels having second color filters corresponding to a second color disposed thereat, via which a pair of second signals, to be used for the split-pupil phase detection, are output;
a phase difference detection unit that detects a phase difference manifested by the first signals or a phase difference manifested by the second signals; and
a defocus amount calculation unit that calculates a defocus amount by using a first conversion coefficient corresponding to the first color when the phase difference detection unit has detected the phase difference manifested by the first signals and by using a second conversion coefficient corresponding to the second color when the phase difference detection unit has detected the phase difference manifested by the second signals.

2. A focus detection device according to claim 1, wherein:
the first color is a color among red color, green color and blue color;
the second color is either of remaining two colors among the red color, the green color and the blue color;
the first conversion coefficient and the second conversion coefficient are each a conversion coefficient among a conversion coefficient corresponding to the red color, a conversion coefficient corresponding to the green color and a conversion coefficient corresponding to the blue color; and
the conversion coefficient corresponding to the red color is greater than the conversion coefficient corresponding to the green color, and the conversion coefficient corresponding to the green color is greater than the conversion coefficient corresponding to the blue color.

3. A focus detection device according to claim 1, further comprising:
a selection unit that selects a pair of signals, which are either the first signals or the second signals, that satisfy a predetermined condition, wherein:
the phase difference detection unit detects the phase difference manifested by one pair of signals satisfying the predetermined condition, having been selected by the selection unit.

4. A focus detection device according to claim 3, further comprising:
a contrast calculation unit that calculates a plurality of contrast values each indicating contrast in the first signals or the second signals, wherein:
the pair of signals that satisfy the predetermined condition are either the first signals or the second signals that correspond to a contrast value, among the plurality of contrast values, taking a greatest value.

5. A focus detection device according to claim 3, further comprising:
a light source color detection sensor that estimates a light source color, wherein:
the pair of signals that satisfy the predetermined condition are either the first signals or the second signals that correspond to the light source color estimated by the light source color detection sensor.

6. A focus detection device according to claim 3, further comprising:
a plurality of image-capturing pixels disposed around the plurality of first pixels and the plurality of second pixels, which include a plurality of first image-capturing pixels having the first color filters disposed thereat and a plurality of second image-capturing pixels having the second color filters disposed thereat, wherein:
when outputs of a plurality of imaging signals provided from the plurality of first image-capturing pixels, among outputs of a plurality of imaging signals provided from the plurality of image-capturing pixels, are greatest, the pair of signals that satisfy the predetermined condition are the first signals.

7. A focus detection device according to claim 3, further comprising:
a read unit that reads out a specific color from an optical system at which an optical system color filter corresponding to the specific color is mounted, wherein:
the pair of signals that satisfy the predetermined condition are either the first signals or the second signals that correspond to the specific color.

8. A focus detection device according to claim 1, further comprising:
an offset quantity setting unit that sets a first offset quantity corresponding to the first color and a second offset quantity corresponding to the second color, wherein:
when the phase difference detection unit has detected the phase difference manifested by the first signals, the defocus amount calculation unit calculates the defocus amount by adding the first offset quantity to a product of the first conversion coefficient multiplied by the phase difference, and when the phase difference detection unit has detected the phase difference manifested by the second signals, the defocus amount calculation unit calculates the defocus amount by adding the second offset quantity to a product of the second conversion coefficient multiplied by the phase difference.

9. A focus detection device according to claim 1, further comprising:
a plurality of third pixels having third color filters corresponding to a third color disposed thereat, which output a pair of third signals to be used for split-pupil phase detection, wherein:
the phase difference detection unit detects a phase difference among the phase difference manifested by the first signals, the phase difference manifested by the second signals and a phase difference manifested by the third signals;
when the phase difference detection unit has detected the phase difference manifested by the first signals, the defocus amount calculation unit calculates the defocus amount by multiplying the first conversion coefficient by the phase difference, when the phase difference detection unit has detected the phase difference manifested by the second signals, the defocus amount calculation unit calculates the defocus amount by multiplying the second conversion coefficient by the phase difference, and when the phase difference detection unit has detected the phase difference manifested by the third signals, the defocus amount calculation unit calculates the defocus amount by multiplying a third conversion coefficient corresponding to the third color by the phase difference;

the first color, the second color and the third color are each a color among the red color, the green color and the blue color; and the first conversion coefficient, the second conversion coefficient and the third conversion coefficient are each a conversion coefficient among a conversion coefficient corresponding to the red color, a conversion coefficient corresponding to the green color and a conversion coefficient corresponding to the blue color.

10. A focus detection device according to claim 1, wherein:
a focus detection pixel row that includes the plurality of first pixels and the plurality of second pixels disposed thereat and a focus detection pixel row that includes the plurality of second pixels and the plurality of third pixels disposed thereat are set adjacent to each other.

11. A focus detection device according to claim 1, further comprising:
a selecting unit that selects a focus detection position that is either a first focus detection position in correspondence to which a plurality of first focus detection pixel rows are disposed or a second focus detection position in correspondence to which a plurality of second focus detection pixel rows are disposed, wherein:
once the selecting unit selects the first focus detection position as the focus detection position, the phase difference detection unit detects the phase difference based upon the first signals and the second signals respectively output from the plurality of first pixels and the plurality of second pixels forming the plurality of first focus detection pixel rows.

12. A focus detection device according to claim 1, wherein:
the phase difference detection unit detects a first phase difference manifested by the first signals and a second phase difference manifested by the second signals; and
the defocus amount calculation unit calculates the defocus amount based upon a value obtained by multiplying the first conversion coefficient by the first phase difference and a value obtained by multiplying the second conversion coefficient by the second phase difference.

13. An image-capturing apparatus, comprising:
a focus detection device according to claim 1;
a drive unit that drives an optical system to a focus match position based upon the defocus amount calculated by the defocus amount calculation unit; and
an acquisition unit that obtains image data based upon outputs from a plurality of focus detection pixels, each of which provides a pair of signals used for the split-pupil phase detection, and outputs from a plurality of image-capturing pixels, each of which provides an imaging signal.

14. A focus detection device, comprising:
a plurality of first pixels, via which a pair of first signals corresponding to a first color are output;
a plurality of second pixels, via which a pair of second signals corresponding to a second color are output;
a phase difference detection unit that detects a phase difference manifested by the pair of first signals or a phase difference manifested by the pair of second signals; and
a defocus amount calculation unit that calculates a defocus amount by using the phase difference manifested by the pair of first signals and a first conversion coefficient corresponding to the first color when the phase difference manifested by the pair of first signals has been detected and by using the phase difference manifested by the pair of second signals and a second conversion coefficient corresponding to the second color when the phase difference manifested by the pair of second signals has been detected.

15. A focus detection device according to claim 14, wherein:
the phase difference detection unit detects the phase difference manifested by the pair of first signals at the plurality of first pixels in an array or the phase difference manifested by the pair of second signals at the plurality of second pixels in an array.

16. A focus detection device according to claim 14, wherein:
the defocus amount is used for driving an optical system to a focus match position.

* * * * *